(12) United States Patent
Chiang et al.

(10) Patent No.: US 8,411,708 B2
(45) Date of Patent: Apr. 2, 2013

(54) DUAL ASYNCHRONOUS MAPPING OF CLIENT SIGNALS OF ARBITRARY RATE

(75) Inventors: Ting-Kuang Chiang, Saratoga, CA (US); Edward E. Sprague, Woodside, CA (US)

(73) Assignee: Infinera Corporation, Sunnyvale, CA (US)

( * ) Notice: Subject to any disclaimer, the term of this patent is extended or adjusted under 35 U.S.C. 154(b) by 273 days.

(21) Appl. No.: 12/367,401

(22) Filed: Feb. 6, 2009

(65) Prior Publication Data

US 2010/0014861 A1 Jan. 21, 2010

Related U.S. Application Data

(60) Provisional application No. 61/027,013, filed on Feb. 7, 2008.

(51) Int. Cl.
*H04J 3/22* (2006.01)
*G06F 15/16* (2006.01)

(52) U.S. Cl. .................. 370/543; 709/233; 709/236

(58) Field of Classification Search .............. 370/543
See application file for complete search history.

(56) References Cited

U.S. PATENT DOCUMENTS

| 6,765,928 | B1 | 7/2004 | Sethuram et al. | |
|---|---|---|---|---|
| 7,353,288 | B1 * | 4/2008 | Rangavajjhala et al. | 709/236 |
| 2003/0048813 | A1 | 3/2003 | Lahav et al. | |
| 2003/0123493 | A1 | 7/2003 | Takahashi | |
| 2003/0161355 | A1 * | 8/2003 | Falcomato et al. | 370/539 |
| 2004/0062277 | A1 * | 4/2004 | Flavin et al. | 370/474 |
| 2005/0117585 | A1 | 6/2005 | Linkewitsch et al. | |
| 2008/0267223 | A1 * | 10/2008 | Meagher et al. | 370/505 |

FOREIGN PATENT DOCUMENTS

| EP | 1229692 A1 | 8/2002 |
|---|---|---|
| WO | 2006/009732 A1 | 1/2006 |

OTHER PUBLICATIONS

Moser, 'International Search Report,' Jun. 2009, European Patent Office, Rijswijk.
Moser, 'Written Opinion of the International Searching Authority,' Jun. 2009, European Patent Office, Munich.
'Interfaces for the Optical Transport Network (OTN); G.709/Y.1331 (Mar. 2003),' ITU-T Standard in Force, International Telecommunications Union, Geneva, No. G.709/Y. 1331, Mar. 2003.

* cited by examiner

*Primary Examiner* — Ayaz Sheikh
*Assistant Examiner* — Sori Aga
(74) *Attorney, Agent, or Firm* — Harrity & Harrity LLP; David L. Soltz

(57) ABSTRACT

A network may include an ingress node that is configured to receive a client signal having a client rate that is one of a multiple different client rates, asynchronously map the client signal into a first frame of a first rate, asynchronously map the first frame into a second frame of a second rate, and output the second frame on the network; an intermediate node that is configured to receive the second frame, recover the first frame from the second frame, asynchronously map the first frame into a third frame of a third rate, and output the third frame on the network, where the intermediate node does not recover the client signal from the first frame; and an egress node that is configured to receive the third frame, recover the first frame from the third frame, recover the client signal from the first frame, and output the client signal.

32 Claims, 15 Drawing Sheets

DUAL ASYNCHRONOUS MAPPING OF CLIENT SIGNALS OF ARBITRARY RATE

RELATED APPLICATION

This application claims priority under 35 U.S.C. §119 based on U.S. Provisional Patent Application No. 61/027,013, filed Feb. 7, 2008, the disclosure of which is incorporated by reference herein in its entirety.

BACKGROUND

Synchronous optical network (SONET) and synchronous digital hierarchy (SDH) are protocols for communicating data over an optical network. The SONET/SDH protocols describe a standardized method for transparent transport of services over optical wavelengths in dense wavelength division multiplexing (DWDM) systems.

The SONET/SDH protocols basically assume that intermediate points of the network (i.e., optical cross-connects, optical add/drop multiplexers and the like) operate in a synchronous fashion, even if asynchronous mapping of data or overhead are deployed at the network ingress or egress. This results in additional costs because it is necessary to provide a mechanism to establish a master clock source in the network and distribute that clock in a tree-like topology that additionally provides full resilience to failures of a clock source or transmission path. It also requires the utilization of high cost, phase locked loop (PLL) circuitry.

SUMMARY

According to one implementation, a network may include an ingress node that is configured to receive a client signal having a client rate that is one of multiple client rates, asynchronously map the client signal into a first frame of a first rate, asynchronously map the first frame into a second frame of a second rate, and output the second frame on the network; an intermediate node that is configured to receive the second frame, recover the first frame from the second frame, asynchronously map the first frame into a third frame of a third rate, and output the third frame on the network, where the intermediate node does not recover the client signal from the first frame; and an egress node that is configured to receive the third frame, recover the first frame from the third frame, recover the client signal from the first frame, and output the client signal.

According to another implementation, a method, performed in a network including at least a first node, a second node, and a third node, may include receiving, by the first node, a client signal at a client rate; asynchronously encapsulating, by the first node, the client signal in a first frame of a first rate; asynchronously encapsulating, by the first node, the first frame in a second frame of a second rate; outputting, by the first node, the second frame to the second node; receiving, by the second node, the second frame; extracting, by the second node, the first frame from the second frame; asynchronously encapsulating, by the second node, the first frame in a third frame of a third rate, and outputting, by the second node, the third frame to the third node; receiving, by the third node, the third frame; extracting, by the third node, the first frame from the third frame; extracting, by the third node, the client signal from the first frame; and outputting, by the third node, the client signal. The client rate, the first rate, the second rate may be independent of each other. The second node may not extract the client signal from the first frame.

According to yet another implementation, an intermediate node, in a network that includes an ingress node and an egress node, may be provided. The intermediate node may include an ingress line module, an egress line module, and a switch fabric connected to the ingress line module and the egress line module. The ingress line module may receive a first frame from the ingress node, the first frame encapsulating a second frame, the second frame encapsulating a client signal, the first frame having a first associated rate, the second frame having a second associated rate, and the client signal having a third associated rate; recover the second frame from the first frame; asynchronously map the second frame to a third frame having a fourth associated rate; and transfer the third frame to the switch fabric. The switch fabric may transfer the third frame to the egress line module. The egress line module may recover the second frame from the third frame; asynchronously map the second frame to a fourth frame having a fifth associated rate; and output the fourth frame to the egress node. The intermediate node may not recover the client signal from the second frame.

According to a further implementation, a method, for transferring data across a network that includes an ingress node, an egress node, and a number of intermediate nodes, may be provided. The method may include receiving, at the ingress node, client signals having a corresponding client rates; asynchronously mapping, at the ingress node, each of the client signals into first frames, where each of the first frames has a same structure and a same rate; transporting the first frames across the network to the egress node via one or more of the intermediate nodes, where none of the one or more of the intermediate nodes recovers any of the client signals; and recovering the client signals at the egress node.

BRIEF DESCRIPTION OF THE DRAWINGS

The accompanying drawings, which are incorporated in and constitute a part of this specification, illustrate one or more implementations described herein and, together with the description, explain these implementations. In the drawings.

DETAILED DESCRIPTION

Figure 1:
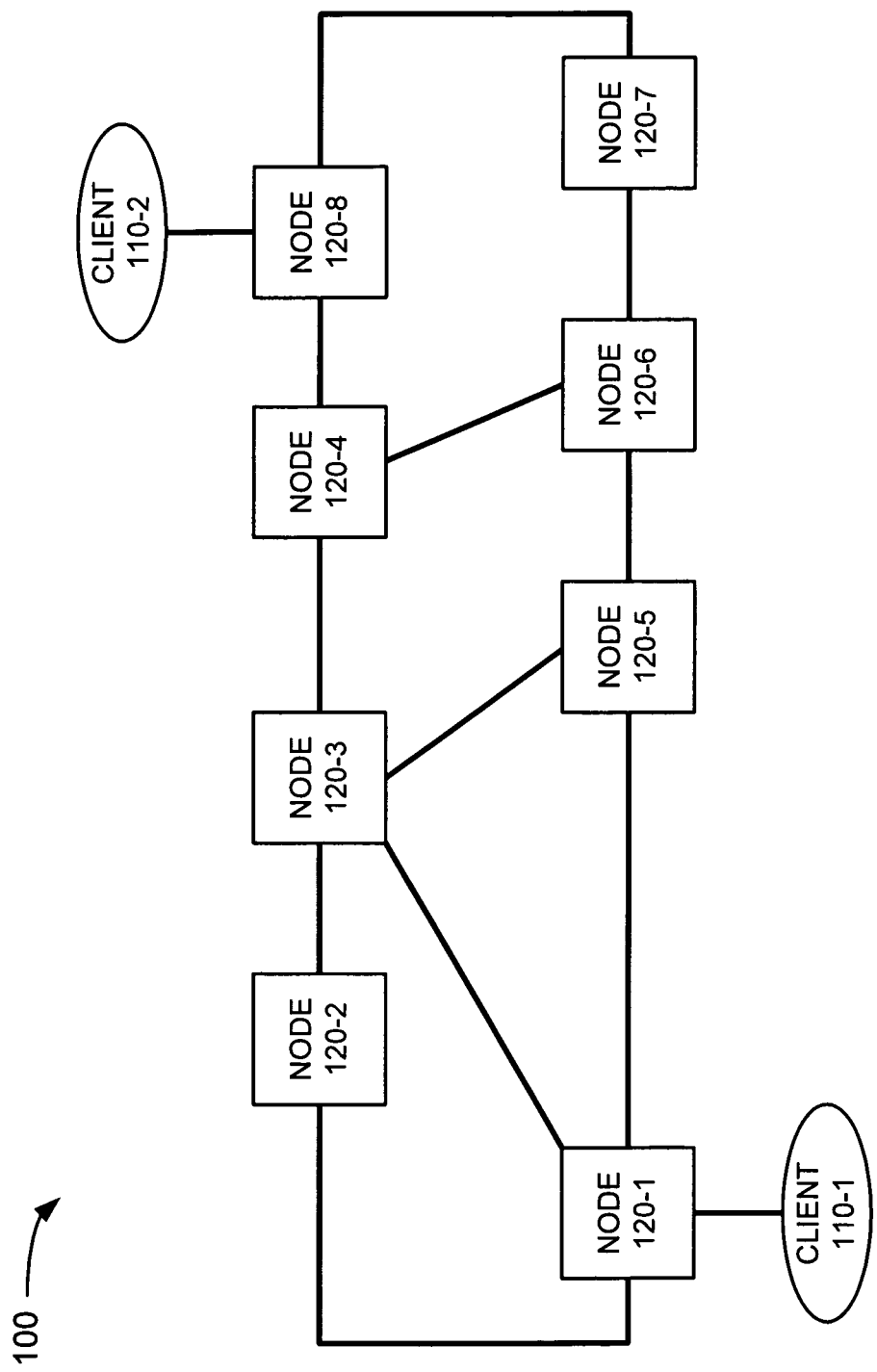
FIG. 1 is a diagram of an exemplary network in which systems and/or methods described herein may be implemented.

The following detailed description refers to the accompanying drawings. The same reference numbers in different drawings may identify the same or similar elements.

Implementations, described herein, may provide a uniform transport mechanism for transferring a client signal through an optical network. Generally, as described below, a client signal, of an arbitrary rate, may be asynchronously mapped into one or more first frames, called switching transport path (XTP) frames. In one implementation, the XTP frame is a structure of a particular, constant length, and a fixed rate, which is independent of the rate of the client signal. In another implementation, the XTP frame may take a different form. The XTP frame may use a combination of variable and fixed stuff locations to compensate for the different rate of the client signal. A "variable stuff location" may refer to a location in a frame that may or may not include client data. A "fixed stuff location" may refer to a location in a frame that includes null data. The XTP frame may be the vehicle for transporting the client signal through the optical network in a manner that is independent of the rate of the client signal.

Within a node, the XTP frame may be asynchronously mapped into a second frame, called an internal switching transport format (iXTF) frame. In one implementation, the iXTF frame is a structure of a particular, constant length, and a fixed nominal rate, which is independent of the rate of the client signal and the rate of the XTP. In another implementation, the iXTF may take a different form. The iXTF frame may be the vehicle for transporting the XTP within the node.

Within a node, the XTP frame may also be asynchronously mapped into a third frame, called a switching transport format (XTF) frame. The XTF frame may be optimized to carry one or a group of XTP frames over an optical link of a particular signaling rate, such as 40 Gbps. The XTF frame may include error correction coding and/or other overhead that enables management, fault detection, and performance monitoring for an optical link.

In one implementation, the XTF frame is a structure of a particular, constant length, and a fixed nominal rate, which is independent of the rate of the client signal and the rate of the XTP. The rate of the links carrying different XTF frames may differ slightly from link-to-link. In one implementation, the rate of the XTF frame is greater than the rate of the XTP frame. The XTF frame may use a variable stuff location to compensate for the different rate of the XTP. The XTF frame may also use a pointer that identifies the start of the XTP within the payload of the XTF frame. The XTF frame may be the vehicle for transporting the XTP from node-to-node within the optical network. In one implementation, the XTF frame may include multiple XTP frames.

There may be more than one version of XTF frame existing in the optical network. For example, there may be a different XTF frame type/rate, such as a 10 Gbps or a 40 Gbps XTF frame, on each wavelength. In this case, different XTF frames may contain a different number of XTP frames, but the XTP frames would still be the same.

At an egress point in the optical network, the XTP frames containing the client signal may be concatenated. The client signal may then be recovered from the XTP frames.

Implementations, described herein, may facilitate the transporting of a client signal though an optical network in a manner that is independent of the rate of the client signal. The client signal may be asynchronously mapped into a first frame that is then asynchronously mapped into second and third frames for transport internal and external to a node in the network, respectively. Each of the different types of frames may operate at a different rate (e.g., operates off of an independent clock source). This minimizes the complexity in the network and eliminates the need to synchronize a common clock across nodes in the network. Also, intermediate nodes in the network may operate upon the fixed-rate, first frames and need not be aware of the client signal(s) being transported in the first frames. As a result, the hardware and software logic at the intermediate nodes can be greatly simplified. Further, this may permit the network to be upgraded to support any arbitrary new client signal type/frequency without requiring any changes to occur at the intermediate nodes.

These implementations may permit any client signal, of any rate, to be asynchronously mapped into one or more frames (i.e., XTP frames) that are uniform throughout the nodes and the network. At different points on the links, internal or external to the nodes, one or more of these frames (i.e., XTP frames) may be asynchronously mapped to the link. For convenience (e.g., efficiency of the physical link), more than one of these frames (i.e., XTP frames) can be carried. Aside from performing mapping and recovery operations, the nodes in the network do not need to do anything different for client signals of different types/rates. Rather, the nodes simply operate upon a uniform frame (i.e., the XTP frame).

The uniformity of the frames transmitted in the network may simplify the hardware and/or software in the nodes. It may also permit any empty slot on any wavelength to be filled with any part of a client signal (wrapped in an XTP frame) and, thus, avoids fragmentation.

Further, in a generalized multi-protocol label switching (GMPLS) network, use of the XTF and XTP frames may simplify GMPLS modeling and network management in terms of software and service management.

Exemplary Network

FIG. 1 is a diagram of an exemplary network 100 in which systems and/or methods described herein may be implemented. For example, network 100 may include clients 110-1 and 110-2 (referred to collectively as "clients 110," and generally as "client 110") and nodes 120-1, . . . , 120-8 (referred to collectively as "nodes 120," and generally as "node 120"). While FIG. 1 shows a particular number and arrangement of devices, network 100 may include additional, fewer, different, or differently arranged devices than those illustrated in FIG. 1. Also, the connections between devices may include direct or indirect connections.

Client 110 may include any type of network device, such as a router, a switch, or a central office, that may transmit data traffic. In one implementation, client 110 may transmit a client signal (e.g., a synchronous optical network (SONET) signal, a synchronous digital hierarchy (SDH) signal, an Ethernet signal, or another type of signal) to node 120. The client signal may conform to any payload type, such as Gigabit Ethernet (GbE), 2×GbE, Fibre Channel (FC), 1GFC, 10GbE local area network (LAN) physical layer (Phy), 10GbE wide area network (WAN) Phy, Synchronous Transport Mode 16 (STM-16), STM-64, Optical Carrier level 48 (OC-48), or OC-192.

Node 120 may include a dense wavelength division multiplexing (DWDM) device. Node 120 may perform optical multiplexing operations (e.g., receive individual client signals on individual optical links and generate a multi-wavelength signal that may be transmitted on a single optical link), optical amplification operations (e.g., amplify the multi-wavelength signal), optical add-drop multiplexing operations (e.g., remove one or more client signals from the multi-wavelength signal), and/or optical demultiplexing operations (e.g., receive the multi-wavelength signal and separate the multi-wavelength signal back into individual client signals that may be transmitted on individual optical links). To perform these operations, node 120 may contain various components, such as an optical multiplexer (to perform the optical multiplexing operations), an optical amplifier (to perform the optical amplification operations), an optical add-drop multiplexer (e.g., a remotely configurable add/drop multiplexer (ROADM) to perform the optical add-drop multiplexing operations), and/or an optical demultiplexer (to perform the optical demultiplexing operations).

Nodes 120 may be connected via optical links. Data traffic may flow from node-to-node over a series of optical links. Any two nodes 120 may connect via multiple optical links. For bidirectional communication, for example, an optical link (commonly referred to as a "working link") may be dedicated for data traffic transmitted in one direction, another optical link (also commonly referred to as a "working link") may be dedicated for data traffic transmitted in the opposite direction, and yet another optical link (commonly referred to as a "protection link") may be used in case of a failure on a working link. In practice, there may be N working links and M protection links between two nodes 120, where M≦N. A collection of working links may be referred to as a "working path," and a collection of protection links may be referred to as a "protection path."

Protection from failures may also be provided at the XTP level. In other words, the unit that is protected is the XTP frame (failed paths could be rerouted at the XTP level). For example, XTP path protection could be implemented where a working path and a protection path are provided, and the receiver could select a good path on a per-XTP basis. This mechanism may be made even simpler because any path can be protected by implementing one mechanism (i.e., the XTP frame).

A node 120 that receives a client signal from a client 110 will be referred to as an "ingress node." A node 120 that transmits a client signal to a client 110 will be referred to as an "egress node." Nodes 120 on the path between the ingress node and the egress node will be referred to as "intermediate nodes." Thus, if client 110-1 transmits a client signal to client 110-2 on a path that includes nodes 120-1, 120-3, 120-4, and 120-8, node 120-1 is the ingress node, node 120-8 is the egress node, and nodes 120-3 and 120-4 are the intermediate nodes. A node 120 may act as an ingress node with regard to one client signal and an intermediate or egress node with regard to another client signal. Thus, nodes 120 may form an arbitrary mesh network.

Exemplary Node Components

Figure 2:
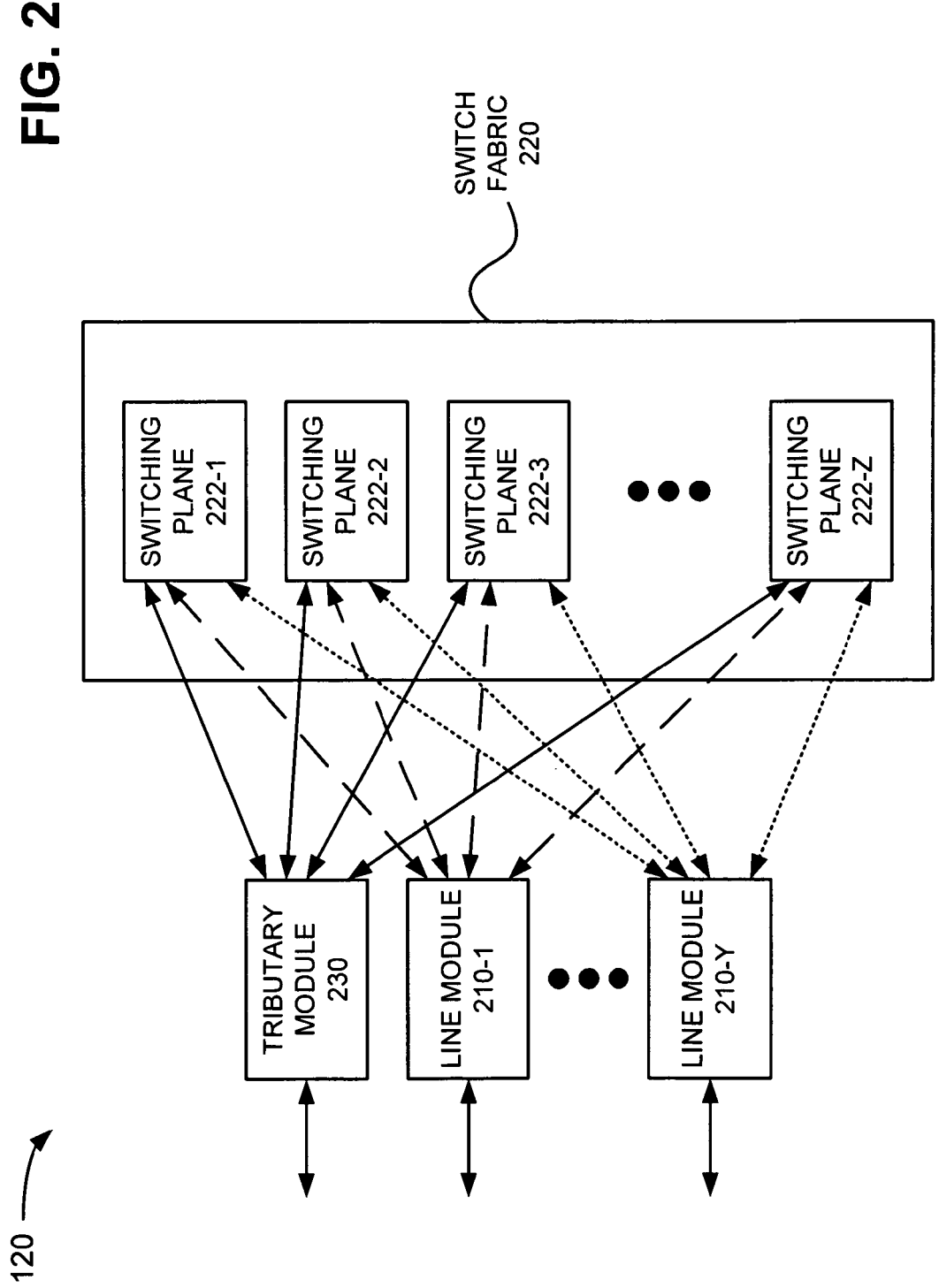
FIG. 2 is a diagram of exemplary components of a node of FIG. 1.

FIG. 2 is a diagram of exemplary components of node 120. As shown in FIG. 2, node 120 may include line modules 210-1, ..., 210-Y (referred to collectively as "line modules 210," and generally as "line module 210") (where Y≧1) connected to a switch fabric 220 and a tributary module 230. As shown in FIG. 2, switch fabric 220 may include switching planes 222-1, 222-2, ... 222-Z (referred to collectively as "switching planes 222," and generally as "switching plane 222") (where Z≧1). While FIG. 2 shows a particular number and arrangement of components, node 120 may include additional, fewer, different, or differently arranged components than those illustrated in FIG. 2. For example, while a single tributary module 230 is shown in FIG. 2, node 120 may include additional tributary modules 230. Also, it may be possible for one of the components of node 120 to perform a function that is described as being performed by another one of the components.

Line module 210 may include hardware components, or a combination of hardware and software components, that may provide network interface operations. Line module 210 may receive a multi-wavelength optical signal and/or transmit a multi-wavelength optical signal. A multi-wavelength optical signal may include a number of optical signals of different optical wavelengths. In one implementation, line module 210 may perform retiming, reshaping, regeneration, time division multiplexing, and/or recoding services for each optical wavelength.

Switch fabric 220 may include hardware components, or a combination of hardware and software components, that may provide switching functions to transfer data between line modules 210. In one implementation, switch fabric 220 may provide fully non-blocking transfer of data. Switch fabric 220 may be configured to switch with the granularity of a single XTP frame. Each switching plane 222 may be programmed to transfer data from a particular input to a particular output.

Tributary module 230 may include hardware components, or a combination of hardware and software components, that may support flexible adding-dropping of multiple services, such as SONET/SDH services, GbE services, optical transport network (OTN) services, and FC services. Tributary module 230 may perform functions, such as client signal encapsulation and decapsulation. In one implementation, tributary module 230, associated with an ingress node, may receive a stream of data, which may include a client signal, and asynchronously map the client signal into one or more XTP frames. A tributary module 230, associated with an egress node, may receive an XTP frame (or a collection of XTP frames) and recover the client signal from the XTP frame (or collection of XTP frames).

As shown in FIG. 2, each of line modules 210 and tributary module 230 may connect to each of switching planes 222. The connections between line modules 210/tributary module 230 and switching planes 222 may be bidirectional. While a single connection is shown between a particular line module 210/tributary module 230 and a particular switching plane 222, the connection may include a pair of unidirectional connections (i.e., one in each direction). A connection from a line module 210/tributary module 230 to a switching plane 222 will be referred to herein as an "ingress switch link," and a connection from a switching plane 222 to a line module 210/tributary module 230 will be referred to as an "egress switch link."

Figure 3:
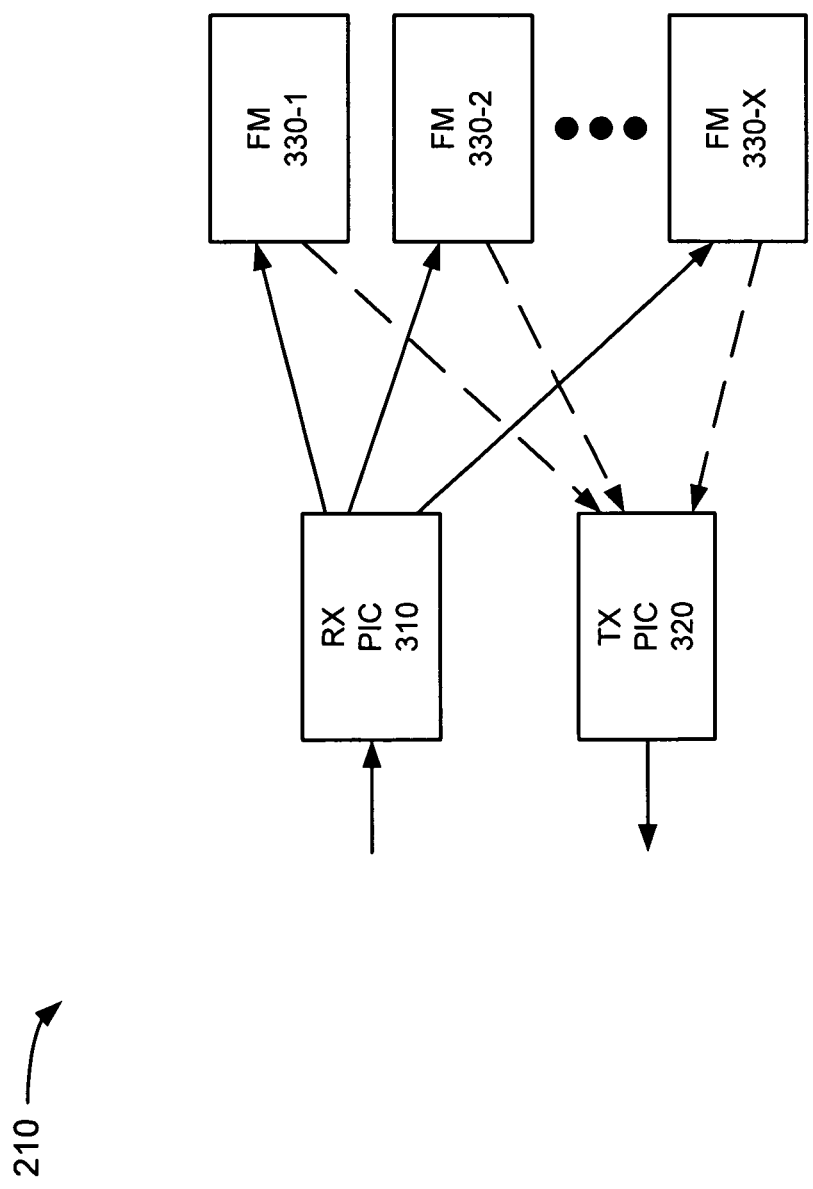
FIG. 3 is a diagram of exemplary components of a line module of FIG. 2.

FIG. 3 is a diagram of exemplary components of a line module 210. As shown in FIG. 3, line module 210 may include a receiver (RX) photonic integrated circuit (PIC) 310, a transmitter (TX) PIC 320, and fabric managers (FMs) 330-1, 330-2, ..., 330-X (referred to collectively as "FMs 330," and generally as "FM 330") (where X≧1). While FIG. 3 shows a particular number and arrangement of components, line module 210 may include additional, fewer, different, or differently arranged components than those illustrated in FIG. 3. Also, it may be possible for one of the components of line module 210 to perform a function that is described as being performed by another one of the components. Tributary module 230 may include one or more similar components.

Receiver PIC 310 may include hardware, or a combination of hardware and software, that may receive a multi-wavelength optical signal, separate the multi-wavelength signal into signals of individual wavelengths, and convert the signals to digital form. In one implementation, receiver PIC 310 may include components, such as a photodetector, a demultiplexer, and/or an optical-to-electrical converter. Transmitter PIC 320 may include hardware, or a combination of hardware and software, that may convert signals from digital form, combine the signals of the individual wavelengths into a multi-wavelength signal, and transmit the multi-wavelength signal. In one implementation, transmitter PIC 320 may include components, such as an electrical-to-optical converter, a multiplexer, and/or a laser. As shown in FIG. 3, receiver PIC 310 and transmitter PIC 320 may connect to each of FMs 330. Receiver PIC 310 may transfer data to FMs 330. Transmitter PIC 320 may receive data from FMs 330.

FM 330 may include hardware, or a combination of hardware and software, that may process digital signals for transmission to switching plane 222 or transmitter PIC 320. In one implementation, FM 330, associated with an ingress node, may receive a stream of data, associated with an XTP frame, from receiver PIC 310 and asynchronously map the XTP frame into an iXTF frame and transmit the iXTF frame to one or more switching planes 222. FM 330 may recover an XTP frame from an iXTF frame received from one or more switching planes 222. FM 330 may also asynchronously map an XTP frame into an XTF frame for transmission, on an optical link, to another node, and recover an XTP frame from an XTF frame received, on an optical link, from another node.

FM 330 may divide a stream of data (representing an iXTF frame) into chunks of continuous bytes, called "timeslots," associated with particular channels (e.g., a channel may refer to a communication between a particular source and a particular destination). In one implementation, each timeslot may include the same quantity of bytes (e.g., each timeslot may contain an equal amount of bandwidth). In another implementation, each timeslot may not include the same quantity of bytes (e.g., at least one timeslot may contain a different amount of bandwidth). The stream of data received by FM 330 may, in one implementation, already be segmented into timeslots. In this situation, when dividing the stream of data into timeslots, FM 330 may identify the timeslots based on, for examples, identifiers in the stream or the data's temporal position within the stream.

FM 330 may divide the data in each timeslot into a number of equal-bandwidth blocks of data. In one implementation, the quantity of blocks may equal the quantity of switches available in switching planes 222. Assume, for example, that there are sixteen switches available in switching planes 222. In this case, FM 330 may divide the data in a timeslot into sixteen equal blocks. FM 330 may send each of the blocks to a different one of the switches. In one implementation, FM 330 may sequentially send each of the blocks in a round robin fashion. In another implementation, FM 330 may send out each of the blocks in another systematic fashion.

Figure 4:
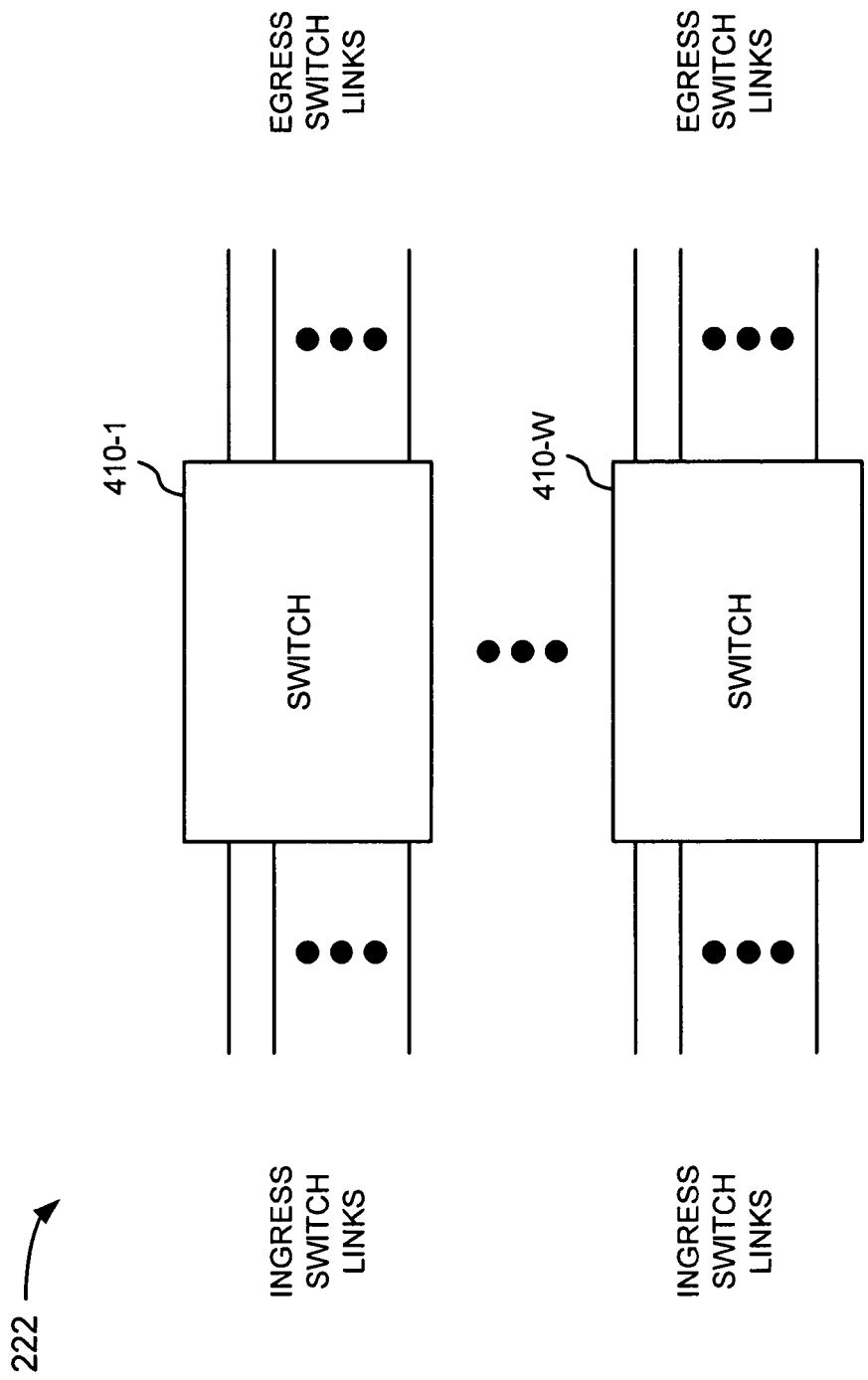
FIG. 4 is a diagram of exemplary components of a switch plane of the switch fabric of FIG. 2.

FIG. 4 is a diagram of exemplary components of a switching plane 222. As shown in FIG. 4, switching plane 222 may include switches 410-1, . . . , 410-W (referred to collectively as "switches 410," and generally as "switch 410") (where W≧1). While FIG. 4 shows a particular number and arrangement of components, switching plane 222 may include additional, fewer, different, or differently arranged components than those illustrated in FIG. 4. Also, it may be possible for one of the components of switching plane 222 to perform a function that is described as being performed by another one of the components.

Switch 410 may include hardware, or a combination of hardware and software, that may transfer a block of data received in a timeslot on an ingress switch link to a timeslot on an egress switch link, where the timeslot on the ingress switch link may differ from the timeslot on the egress switch link. Switch 410 may include a set of ingress switch links via which data is received, and a set of egress switch links via which data is transmitted. Each ingress switch link and egress switch link may connect to a particular FM 330. Switch 410 may be programmed with mapping information that instructs switch 410 on which egress switch link and in what timeslot to send a block of data received within a particular timeslot on a particular ingress switch link.

XTP, iXTF, and XTF Frame Formats

Figure 5:
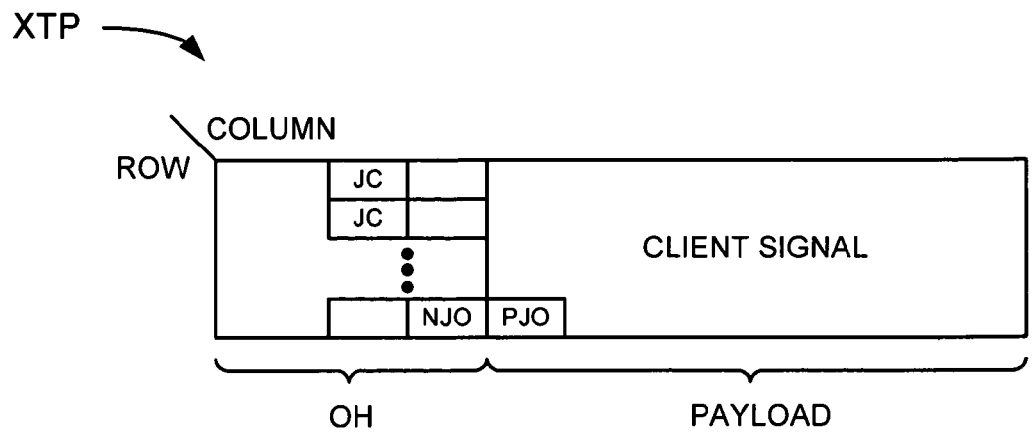
FIG. 5 is a diagram of exemplary data of a switching transport path (XTP) frame.

FIG. 5 is a diagram of exemplary data of an XTP frame. As shown in FIG. 5, an XTP frame may include an overhead (OH) section and a payload section. In another implementation, the XTP frame may include additional or different sections than those shown in FIG. 5. For example, the XTP frame may include a forward error correction (FEC) section that may store data to aid in detecting and correcting errors.

The data of the XTP frame may be arranged as bytes of data in a number of rows and columns. When the XTP frame is transmitted, the data bytes in the first row may be transmitted, followed by the data bytes in the second row, and so forth. Thus, transmission of the XTP frame may include the transmission of overhead data followed by payload data (from the first row), the transmission of overhead data followed by payload data (from the second row), etc.

The overhead section may store data that aids in creation, transmission, performance management, fault management, and/or recovery of data of the XTP frame. In one implementation, the overhead section may store data similar to the data described in ITU-T Recommendation G.709. The payload section may store data from the client signal.

The XTP frame may use a combination of fixed and variable stuff locations to adapt the arbitrary client signal rate to the payload section of the XTP frame at a fixed rate, where the fixed rate of the XTP frame is independent of the rate of the client signal. In one implementation, the rate of the XTP frame is approximately 1.3324 Gbps. In another implementation, the rate of the XTP frame may be less or greater than 1.3324 Gbps.

The XTP frame may use a combination of justification control (JC) data and a negative justification opportunity (NJO) in the overhead section, and fixed and variable stuff areas in the payload section of the XTP frame to compensate for the arbitrary rate of the client signal. Fixed stuff locations are locations (that may be distributed throughout the payload) that do not carry any data in the payload section. The fixed stuff locations may vary for different client signal rates. The variable stuff location may refer to a location (shown as a positive justification opportunity (PJO) in FIG. 5) in the payload section that may or may not carry data in the XTP frame. A decision may be made, once per XTP frame, whether to store data in the variable stuff location or to "stuff" the variable stuff location (i.e., store null data).

Figure 6:
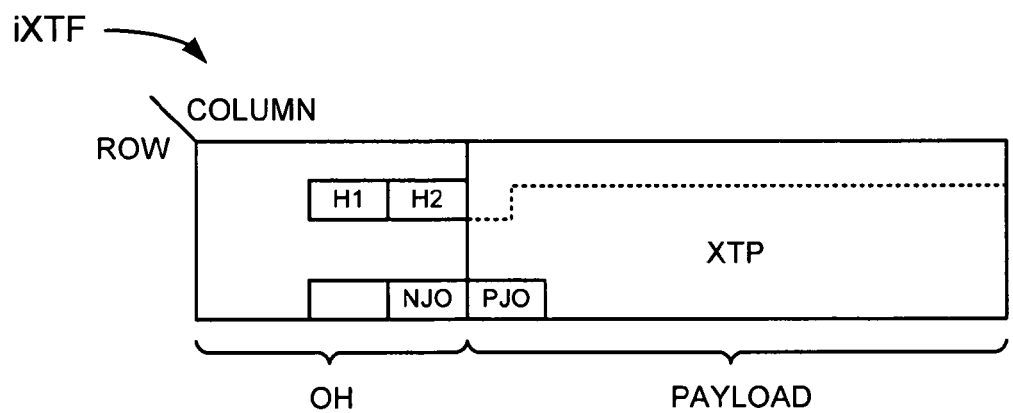
FIG. 6 is a diagram of exemplary data of an internal switching transport format (iXTF) frame.

FIG. 6 is a diagram of exemplary data of an iXTF frame. As shown in FIG. 6, an iXTF frame may include an overhead (OH) section and a payload section. In another implementation, the iXTF frame may include additional or different sections than those shown in FIG. 6. For example, the iXTF frame may include a forward error correction (FEC) section that may store data to aid in detecting and correcting errors.

The data of the iXTF frame may be arranged as bytes of data in a number of rows and columns. When the iXTF frame is transmitted, the data bytes in the first row may be transmitted, followed by the data bytes in the second row, and so forth. Thus, transmission of the iXTF frame may include the transmission of overhead data followed by payload data (from the first row), the transmission of overhead data followed by payload data (from the second row), etc.

The overhead section may store data that aids in creation, transmission, performance management, fault management, and/or recovery of data of the iXTF frame. In one implementation, the overhead section may store data similar to the data described in ITU-T Recommendation G.709. The payload section may store data of an XTP frame. In one implementation, the payload section may store data from a single XTP frame. In another implementation, the payload section may store data from multiple XTP frames.

Since the rate of the XTP frame is fixed and the rate of the iXTF frame is also fixed (though the rates are independent of each other and derived from independent clock sources), the iXTF frame may use a variable stuff location, but need not use fixed stuff locations. For example, the iXTF frame may use a pointer (e.g., offset), shown in FIG. 6 as H1 and H2 data, that identifies the location where the XTP data starts in the payload section. The pointer may permit the overhead section of the XTP to be easily located at, for example, intermediate nodes in the network, and may also permit the XTP frames to be deskewed at the egress node before the client signal is extracted. The iXTF frame may use a negative justification opportunity (NJO) and a positive justification opportunity (PJO) as a variable stuff location. The variable stuff location may refer to part of the payload section that may or may not carry data in the XTP frame. A decision may be made, once per iXTF frame, whether to store data in the variable stuff location.

Figure 7:
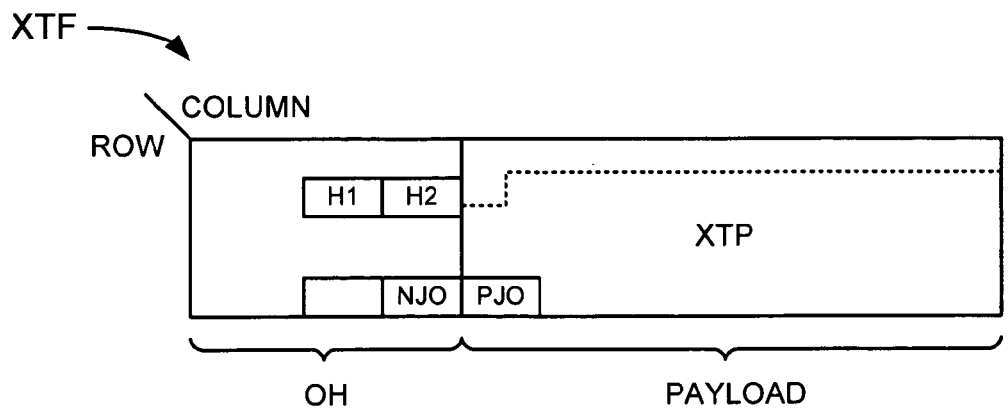
FIG. 7 is a diagram of exemplary data of a switching transport format (XTF) frame.

FIG. 7 is a diagram of exemplary data of an XTF frame. As shown in FIG. 7, an XTF frame may include an overhead (OH) section and a payload section. In another implementation, the XTF frame may include additional or different sections than those shown in FIG. 7. For example, the XTF frame may include a forward error correction (FEC) section that may store data to aid in detecting and correcting errors.

The data of the XTF frame may be arranged as bytes of data in a number of rows and columns. When the XTF frame is transmitted, the data bytes in the first row may be transmitted, followed by the data bytes in the second row, and so forth. Thus, transmission of the XTF frame may include the transmission of overhead data followed by payload data (from the first row), the transmission of overhead data followed by payload data (from the second row), etc.

The overhead section may store data that aids in creation, transmission, performance management, fault management, and/or recovery of data of the XTF frame. In one implementation, the overhead section may store data similar to the data described in ITU-T Recommendation G.709. The payload section may store data of an XTP frame. In one implementation, the payload section may store data from a single XTP frame. In another implementation, the payload section may store data from multiple XTP frames.

Since the rate of the XTP frame is fixed and the rate of the XTF frame is also fixed (though the rates are independent of each other and derived from independent clock sources), the XTF frame may use a variable stuff location, but need not use fixed stuff locations. For example, the XTF frame may use a pointer (e.g., offset), shown in FIG. 7 as H1 and H2 data, that identifies the location where the XTP data starts in the payload section. The pointer may permit the overhead section of the XTP to be easily located at, for example, intermediate nodes in the network, and may also permit the XTP frames to be deskewed at the egress node before the client signal is extracted. The XTF frame may use a negative justification opportunity (NJO) and a positive justification opportunity (PJO) as a variable stuff location. The variable stuff location may refer to part of the payload section that may or may not carry data in the XTF frame. A decision may be made, once per XTF frame, whether to store data in the variable stuff location.

Exemplary Processes

In the description to follow, reference will be made to certain operations that may be performed to transmit a client signal through an optical network from an ingress node (e.g., node 120-1 in FIG. 1) to an egress node (e.g., node 120-8 in FIG. 1) via an intermediate node (e.g., node 120-3 or node 120-4 in FIG. 1).

Figure 8:
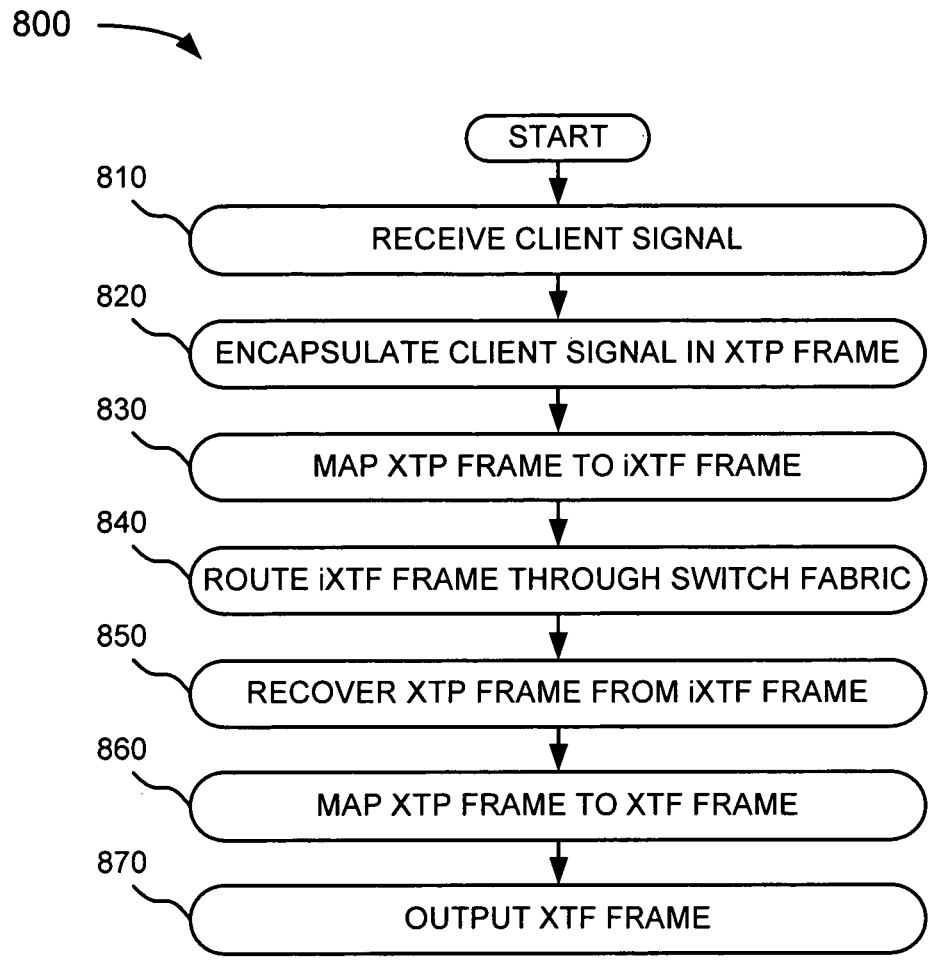
FIG. 8 is a flowchart of an exemplary process for performing dual asynchronous mapping of a client signal at an ingress node.

FIG. 8 is a flowchart of an exemplary process 800 for performing dual asynchronous mapping of a client signal at an ingress node. Process 800 may be performed by one or more components within the ingress node.

Process 800 may begin with receipt of a client signal (block 810). For example, a tributary module 230, of the ingress node, may receive an optical signal on an individual wavelength, and convert the signal to a stream of digital data, which may include a client signal.

The client signal may be encapsulated in an XTP frame (block 820). For example, tributary module 230 may asynchronously map the client signal into an XTP frame. A single XTP frame may include all or a portion of the client signal. For a client signal with a rate over a particular threshold (e.g., greater than approximately 1.31 Gbps), tributary module 230 may asynchronously map the client signal into multiple XTP frames (e.g., partition the client signal into portions (where each portion may fit into the payload of an XTP frame) and map each of the portions into a separate XTP frame).

Figure 9:
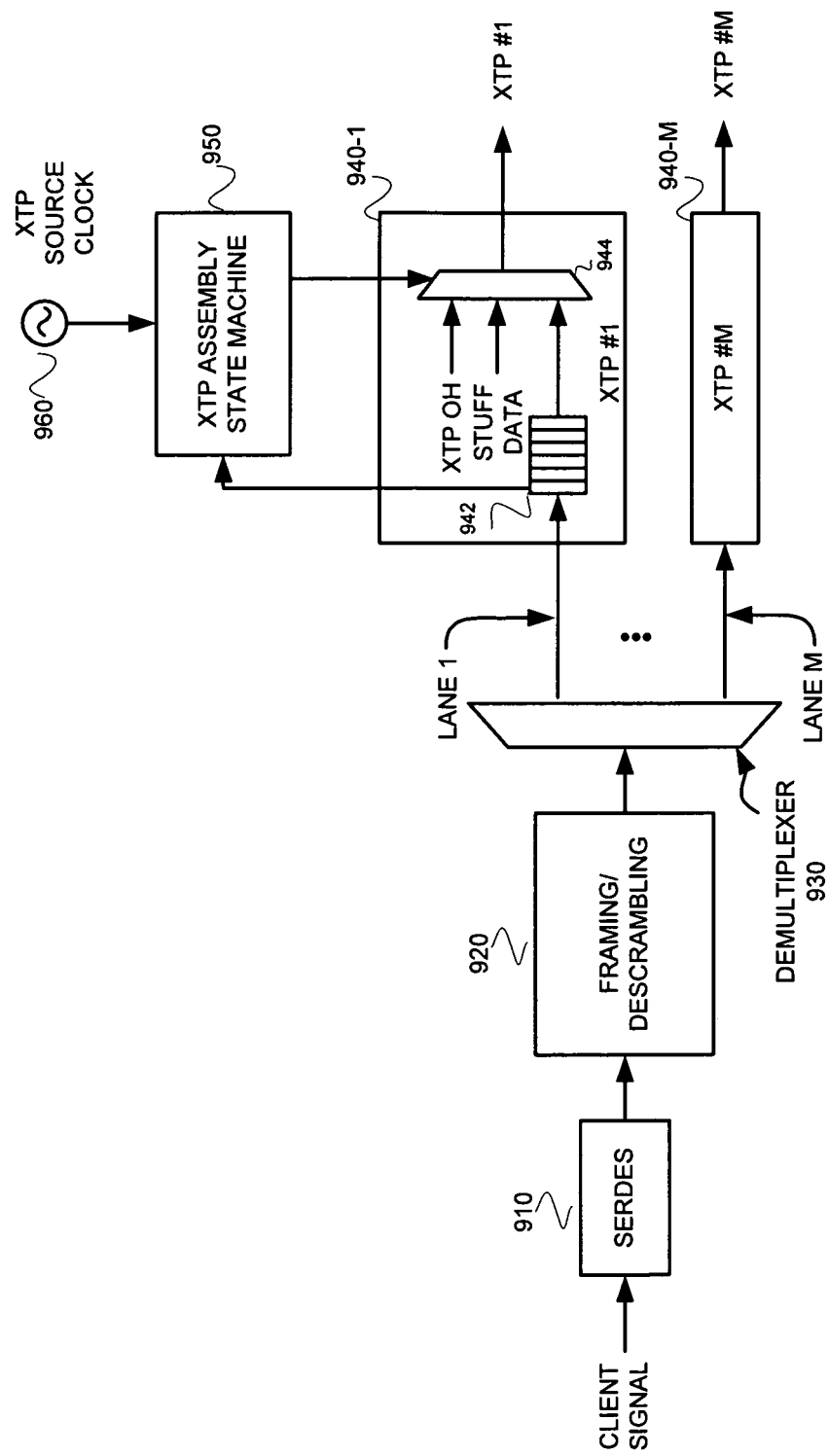
FIG. 9 is a diagram of exemplary functional components for asynchronously mapping a client signal into multiple XTP frames.

FIG. 9 is a diagram of exemplary functional components for asynchronously mapping the client signal into multiple XTP frames. In one implementation, tributary module 230 may include hardware, or a combination of hardware and software, to implement the functions of the components shown in FIG. 9. In another implementation, a device separate from, or in combination with, tributary module 230 may perform one or more of the functions described below.

Tributary module 230 may include a serializer/deserializer (SerDes) 910, a framing/descrambling component 920, a demultiplexer 930, XTP assembly components 940-1 through 940-M (where M≧1), an XTP assembly state machine 950, and an XTP source clock 960. XTP assembly component 940 may include a buffer 942 and a multiplexer 944. In another implementation, tributary module 230 may include additional, fewer, or different functional components to asynchronously map a client signal into an XTP frame.

SerDes 910 may receive the client signal and synchronously convert the client signal to parallel format. In one implementation, SerDes 910 may operate from an externally applied reference that may be some sub-multiple of the bit rate of the client signal. Framing/descrambling component 920 may perform framing and descrambling operations on the client signal. For example, framing/descrambling component 920 may recover client frame sync (e.g., based on a framing word) and may descramble the overhead and payload of the client signal. Demultiplexer 930 may receive the client signal after the framing and descrambling. Demultiplexer 930 may decompose the client signal into multiple parts using, for example, byte or word deinterleaving. It may be unnecessary, however, for the client signal to be aligned to the data path on byte/word boundaries. Demultiplexer 930 may output the parts of the client signal on M lanes. Each of the M lanes may be input to a different one of XTP assembly components 940.

The parts of the client signal may be forwarded, via the M lanes, to buffers 942 of XTP assembly components 940. Buffers 942 may include elastic buffers, such as first-in, first-out (FIFO) memories, that serve to decouple the client signal rate from the rate of the XTP frames.

XTP assembly state machine 950 may asynchronously map each part of the client signal to the payload area of an XTP frame. XTP assembly state machine 950 may assemble the individual XTP frames. The XTP rate may be driven by a free-running local oscillator (shown as XTP source clock 960 in FIG. 9). As described above, for a given nominal client signal rate (e.g., the nominal rate of each lane, after decomposition), certain defined locations in the XTP frame may always be null and may not contain data. As described above, these locations are called "fixed stuff" locations. The fixed stuff definition may be client rate-specific. Additionally, the XTP frame may contain positive and negative justification opportunities (PJOs/NJOs), which may or may not contain data for a given XTP frame. Finally, the XTP frame may include justification control indicators (JCs). The JCs may include flags that indicate whether or not the PJOs/NJOs do or do not contain data for a given XTP frame. To summarize, the fixed stuff locations may essentially define a fixed, client-specific nominal bandwidth and the PJOs/NJOs may dynamically adapt to the difference between the actual client rate and the fixed rate of the XTP frame.

XTP assembly state machine 950 may sequentially assemble each XTP frame by controlling the operation of multiplexer 944. For example, XTP assembly state machine 950 may cause multiplexer 944 to select data derived from buffer 942, fixed stuff data, XTP overhead data, and the justification control indicators. Fixed stuff locations are client rate-specific. During justification opportunities, XTP assembly state machine 950 may determine whether to insert data or stuff, based on the status of buffer 942, thereby keeping buffer 942 from overflowing or underflowing. XTP assembly state machine 950 may encode the associated justification control indicators to reflect the contents of the justification opportunities. The output of XTP assembly components 940 may include XTP frames containing the client signal.

Returning to FIG. 8, the XTP frame may be asynchronously mapped to an iXTF frame (block 830). As explained above, the iXTF frame may be used to transport the XTP frame through switch fabric 220 (FIG. 2) in a manner such that the client signal is opaque to switch fabric 220.

Figure 10:
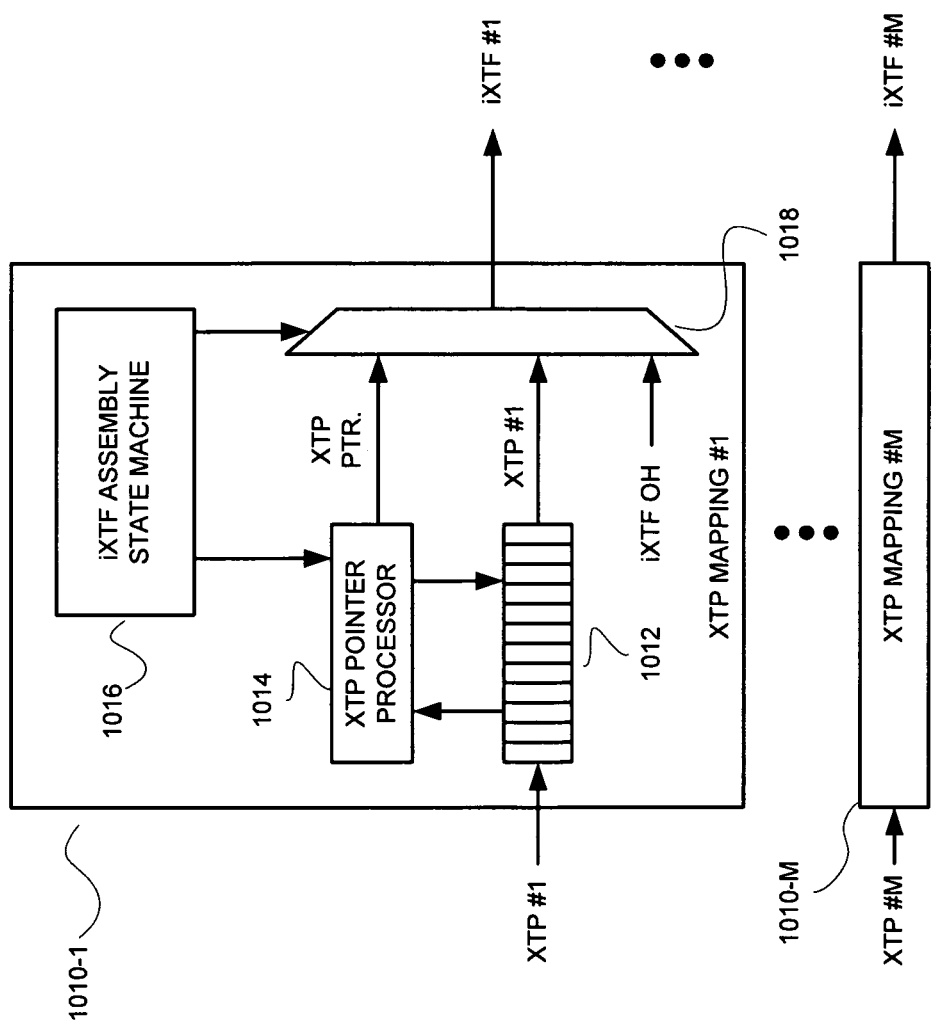
FIG. 10 is a diagram of exemplary functional components for asynchronously mapping an XTP frame into an iXTF frame.

FIG. 10 is a diagram of exemplary functional components for asynchronously mapping an XTP frame into an iXTF frame. In one implementation, tributary module 230 may include hardware, or a combination of hardware and software, to implement the functions of the components shown in FIG. 10. In another implementation, a device separate from, or in combination with, tributary module 230 may perform one or more of the functions described below.

Tributary module 230 may include XTP mapping components 1010-1 through 1010-M (collectively referred to as "XTP mapping components 1010," and generally as "XTP mapping component 1010") (where M≧1). Each XTP mapping component 1010 may include a buffer 1012, an XTP pointer processor 1014, an iXTF assembly state machine 1016, and a multiplexer 1018. In another implementation, tributary module 230 may include additional, fewer, or different functional components to asynchronously map an XTP frame to an iXTF frame.

Buffer 1012 may include an elastic buffer, such as a FIFO memory, that receives data of an XTP frame. Buffer 1012 may serve to decouple the rate of the XTP frame from the rate of the iXTF frame. XTP pointer processor 1014 may monitor the XTP pointer to identify the start of the XTP frame within buffer 1012. XTP pointer processor 1014 may recover the XTP overhead, for monitoring purposes, once the start of the XTP frame is identified. XTP pointer processor 1014 may dynamically adapt for the difference in the rate of the XTP frame and the rate of the iXTF frame using a variable stuff location. As described above, the location at which the XTP starts within the payload of the iXTF frame may be identified in the overhead of the iXTF frame.

iXTF assembly state machine 1016 may asynchronously map the XTP frame to the payload area of an iXTF frame. In one implementation, the iXTF frame includes a single XTP frame. In another implementation, the iXTF frame may include a portion of or more than one XTP frame. iXTF assembly state machine 1016 may operate based on the clock of switch fabric 220.

iXTF assembly state machine 1016 may sequentially assemble each iXTF frame by controlling the operation of multiplexer 1018. For example, iXTF assembly state machine 1016 may cause multiplexer 1018 to select data derived from buffer 1012, the XTP pointer, and iXTF overhead data. The output of XTP mapping components 1010 may include iXTF frames containing XTP frames.

As shown in FIG. 10, each XTP mapping component 1010 may include a separate iXTF assembly state machine 1016. In an alternative implementation, a single iXTF assembly state machine 1016 may be used for multiple XTP mapping components 1010.

Returning to FIG. 8, the iXTF frame may be routed through switch fabric 220 (block 840). For example, tributary module 230 may segment the iXTF frame into switch timeslots and distribute the iXTF frame segments on ingress links associated with one or more of switch planes 222. Switches 410 (FIG. 4) may receive the iXTF frame segments and identify egress links and timeslots on which to output the iXTF frame segments based on the ingress links on which the iXTF frame segments are received and the timeslots during which the iXTF frame segments are received. Switches 410 may store mapping information that maps a combination of an input timeslot and an ingress link to an output timeslot and an egress link. Switches 410 may route the iXTF frame segments accordingly.

The XTP frame may be recovered from the iXTF frame (block 850). For example, an egress line module 210 may receive the iXTF frame from switch fabric 220. Egress line module 210 may recover the XTP frame from the iXTF frame.

Figure 11:
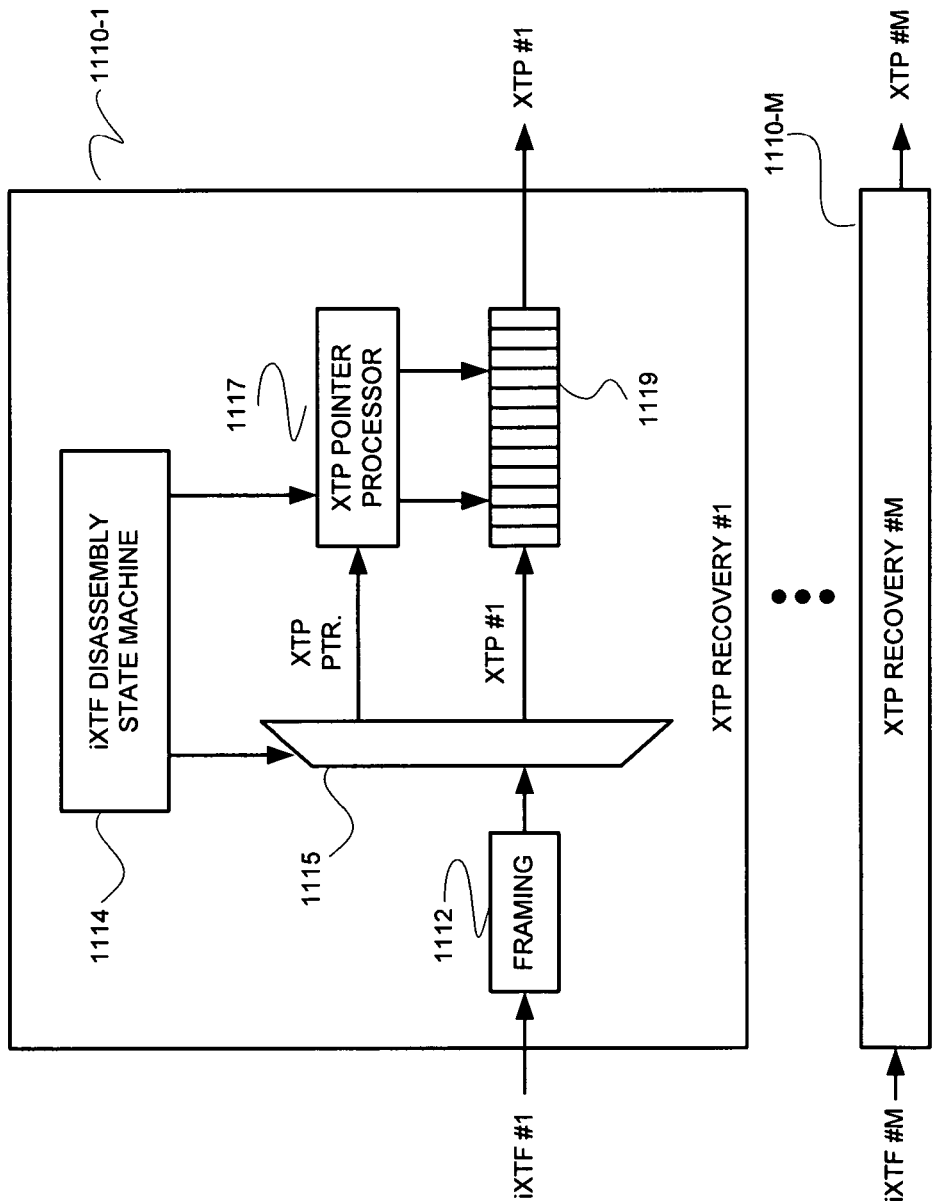
FIG. 11 is a diagram of exemplary functional components for recovering an XTP frame from an iXTF frame.

FIG. 11 is a diagram of exemplary functional components for recovering an XTP frame from an iXTF frame. In one implementation, egress line module 210 may include hardware, or a combination of hardware and software, to implement the functions of the components shown in FIG. 11. In another implementation, a device separate from, or in combination with, egress line module 210 may perform one or more of the functions described below.

Egress line module 210 may include XTP recovery components 1110-1 through 1110-M (collectively referred to as "XTP recovery components 1110," and generally as "XTP recovery component 1110") (where M≧1). Each XTP recovery component 1110 may include a framing component 1112, an iXTF disassembly state machine 1114, a demultiplexer 1115, an XTP pointer processor 1117, and a buffer 1119. In another implementation, egress line module 210 may include additional, fewer, or different functional components to recover an XTP frame from an iXTF frame.

Framing component 1112 may receive an iXTF frame and recover the iXTF frame sync (e.g., based on an iXTF framing word). In one implementation, framing is performed separately for each iXTF frame.

iXTF disassembly state machine 1114 may recover the XTP frame from the iXTF frame. As explained above, in one implementation, the iXTF frame includes a single XTP frame. In another implementation, the iXTF frame may include a portion of or more than one XTP frame. iXTF disassembly state machine 1114 may operate based on the clock of switch fabric 220.

iXTF disassembly state machine 1114 may recover each XTP frame by controlling the operation of demultiplexer 1115. For example, iXTF disassembly state machine 1115 may cause demultiplexer 1115 to extract the XTP frame and the iXTF overhead including the XTP pointer. The XTP pointer may be sent to XTP pointer processor 1117 and the XTP frame may be sent to buffer 1119.

Buffer 1119 may include an elastic buffer, such as a FIFO memory, that receives data of an XTP frame. Buffer 1119 may serve to decouple the rate of the XTP frame from the rate of the iXTF frame. XTP pointer processor 1117 may monitor the XTP pointer to identify the start of the XTP frame within buffer 1119. XTP pointer processor 1117 may recover the XTP overhead, for monitoring purposes, once the start of the XTP frame is identified. XTP pointer processor 1117 may also generate a pointer for a next frame encapsulation (not shown). In one implementation, XTP pointer processor 1117 may receive input from another state machine (e.g., a state machine for mapping the XTP frame into an XTF frame, such as described below with regard to FIG. 12 (not shown in FIG. 11)) to assist XTP pointer processor 1117 in unloading data from buffer 1119. The output of buffer 1119 may include an XTP frame.

As shown in FIG. 11, each XTP recovery component 1110 may include a separate iXTF disassembly state machine 1114. In an alternative implementation, a single iXTF disassembly state machine 1114 may be used for multiple XTP recovery components 1110.

Returning to FIG. 8, the XTP frame may be asynchronously mapped to an XTF frame (block 860). As explained above, the XTF frame may be used to transport the XTP frame through the optical network in a manner such that the client signal is opaque to intermediate nodes in the network.

Figure 12:
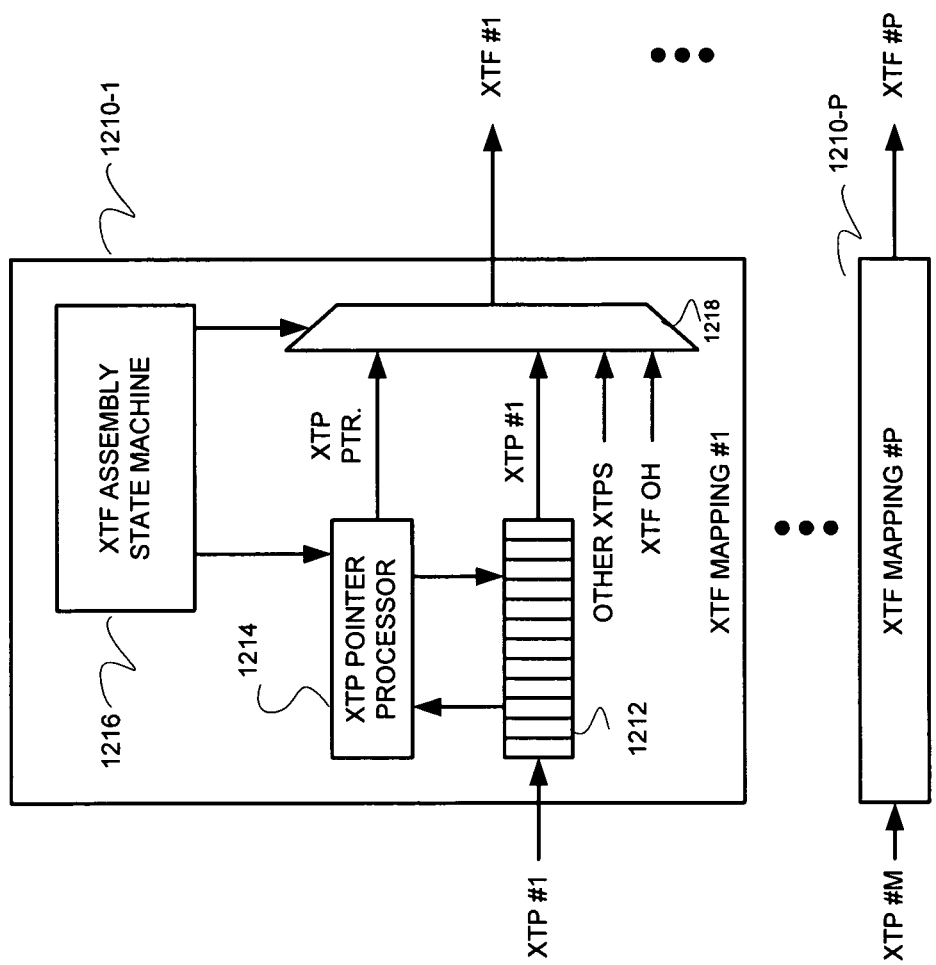
FIG. 12 is a diagram of exemplary functional components for asynchronously mapping an XTP frame into an XTF frame.

FIG. 12 is a diagram of exemplary functional components for asynchronously mapping an XTP frame into an XTF frame. In one implementation, an egress line module 210 may include hardware, or a combination of hardware and software, to implement the functions of the components shown in FIG. 12. In another implementation, a device separate from, or in combination with, egress line module 210 may perform one or more of the functions described below.

Egress line module 210 may include XTF mapping components 1210-1 through 1210-P (where P≦M) (collectively referred to as "XTF mapping components 1210," and generally as "XTF mapping component 1210"). Each XTF mapping component 1210 may include a buffer 1212, an XTF pointer processor 1214, an XTF assembly state machine 1216, and a multiplexer 1218. In another implementation, egress line module 210 may include additional, fewer, or different functional components to asynchronously map an XTP frame to an XTF frame.

Buffer 1212 may include an elastic buffer, such as a FIFO memory, that receives data of an XTP frame. Buffer 1212 may serve to decouple the rate of the XTP frame from the rate of the XTF frame. XTP pointer processor 1214 may monitor the XTP pointer to identify the start of the XTP frame within buffer 1212. XTP pointer processor 1214 may recover the XTP overhead, for monitoring purposes, once the start of the XTP frame is identified. XTP pointer processor 1214 may dynamically adapt for the difference in the rate of the XTP frame and the rate of the XTF frame using a variable stuff location. As described above, the location at which the XTP starts within the payload of the XTF frame may be identified in the overhead of the XTF frame.

XTF assembly state machine 1216 may asynchronously map the XTP frame to the payload area of an XTF frame. In one implementation, the XTF frame includes multiple XTP frames. In another implementation, the XTF frame may include a portion of or a single XTP frame. XTF assembly state machine 1216 may operate based on an external clock associated with the optical link transmitter.

XTF assembly state machine 1216 may sequentially assemble each XTF frame by controlling the operation of multiplexer 1218. For example, XTF assembly state machine 1216 may cause multiplexer 1218 to select XTP frame data derived from buffer 1212, the XTP pointer, XTF overhead data, and/or data associated with one or more other XTP frames (which may be output from other buffers 1212 (not shown in FIG. 12)). The output of XTF mapping components 1210 may include XTF frames containing XTP frames.

As shown in FIG. 12, each XTF mapping component 1210 may include a separate XTF assembly state machine 1216. In an alternative implementation, a single XTF assembly state machine 1216 may be used for multiple XTF mapping components 1210.

Returning to FIG. 8, the XTF frame may be output (block 870). For example, egress line module 210 may transmit the XTF frame on an optical link toward its destination. In one implementation, egress line module 210 may convert the XTF frame to an optical signal, of a particular wavelength, and combine the optical signal with one or more other optical signals, of one or more other wavelengths, to create a multi-wavelength optical signal that may be transmitted on the optical link. The XTF frame may transit one or more intermediate nodes 120 in the optical network.

Figure 13:
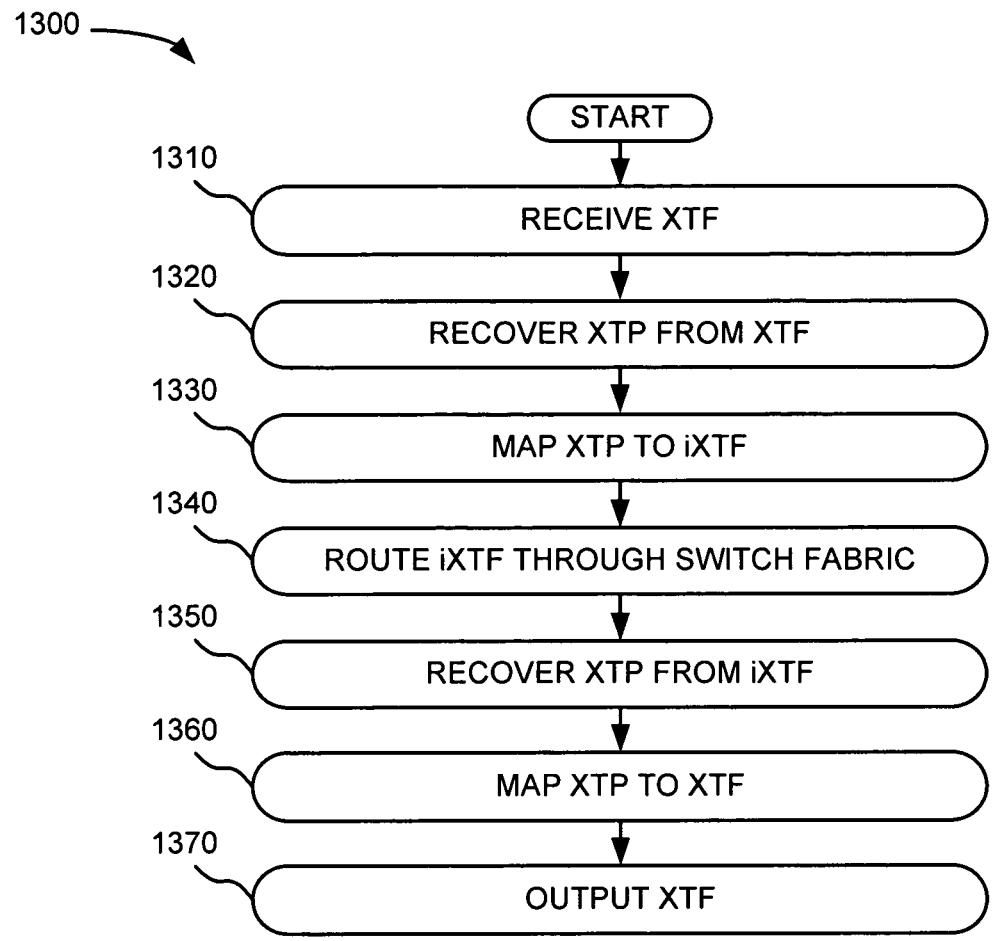
FIG. 13 is a flowchart of an exemplary process for performing asynchronous mapping of an XTP frame at an intermediate node.

FIG. 13 is a flowchart of an exemplary process 1300 for performing asynchronous mapping of an XTP frame at an intermediate node. Process 1300 may be performed by one or more components within the intermediate node.

Process 1300 may begin with receipt of an XTF frame (block 1310). For example, an ingress line module 210, of the intermediate node, may receive a multi-wavelength optical signal, separate the multi-wavelength signal into signals of individual wavelengths, and convert the signals to a stream of digital data, which may represent an XTF frame. A FM 330, within ingress line module 210, may receive the stream of data representing the XTF frame.

An XTP frame may be recovered from the XTF frame (block 820). For example, ingress line module 210 may recover one or more XTP frames from a received XTF frame. In one implementation, as described above, a single XTF frame may include multiple XTP frames. In another implementation, a single XTF frame may include all or a portion of a single XTP frame.

Figure 14:
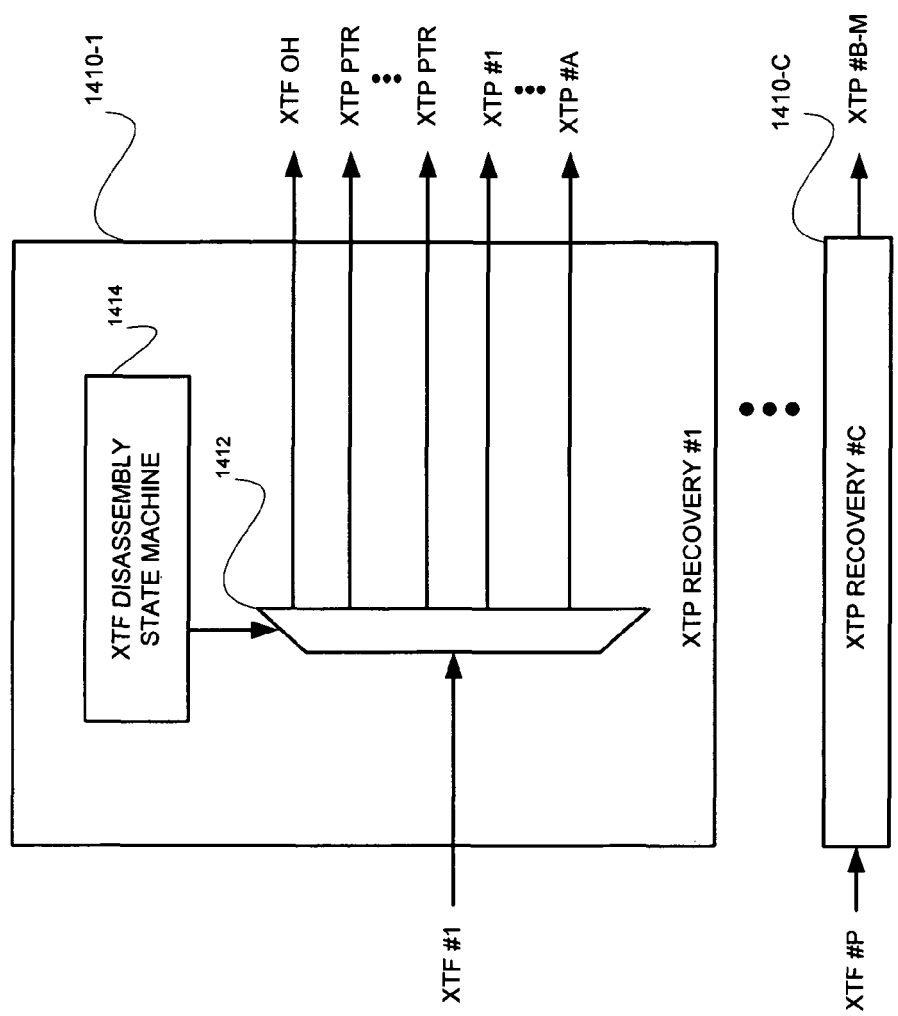
FIG. 14 is a diagram of exemplary functional components for recovering an XTP frame from an XTF frame.

FIG. 14 is a diagram of exemplary functional components for recovering multiple XTP frames from an XTF frame. In one implementation, ingress line module 210 may include hardware, or a combination of hardware and software, to implement the functions of the components shown in FIG. 14. In another implementation, a device separate from, or in combination with, ingress line module 210 may perform one or more of the functions described below.

Ingress line module 210 may include XTP recovery components 1410-1 through 1410-C (referred to collectively as "XTP recovery components 1410," and generally as "XTP recovery component 1410") (where C>1). Each XTP recovery component 1410 may include a demultiplexer 1412 and an XTF disassembly state machine 1414. In another implementation, ingress line module 210 may include additional, fewer, or different functional components to recover an XTP frame from an XTF frame. For example, in another implementation, each XTP recovery component 1410 may include additional components, such as a framing component, an XTP pointer processor, and/or a buffer to aid in the recovery of the XTP frame. In this situation, the framing component, the XTP pointer processor, and/or the buffer may operate in a manner similar to that described above with regard to FIG. 11.

Demultiplexer 1412 may receive the XTF frame. The operation of demultiplexer 1412 may be controlled by XTF disassembly state machine 1414. XTF disassembly state machine 1414 may recover the XTP frame from the XTF frame. As explained above, in one implementation, the XTF frame includes multiple XTP frames. In another implementation, the XTF frame may include a portion of or a single XTP frame. XTF disassembly state machine 1414 may operate based on an external clock associated with the optical receiver.

XTF disassembly state machine 1414 may recover a group of XTP frames (shown as XTP frames 1-A) by controlling the operation of demultiplexer 1412. For example, XTF disassembly state machine 1414 may cause demultiplexer 1412 to extract the XTP frames and the XTF overhead including the XTP pointers. Each of the XTP pointers may identify a location at which a corresponding XTP frame begins within the payload of the XTF frame.

As shown in FIG. 14, each XTP recovery component 1410 may include a separate XTF disassembly state machine 1414. In an alternative implementation, a single XTF disassembly state machine 1414 may be used for multiple XTP recovery components 1410.

Returning to FIG. 13, the XTP frame may be asynchronously mapped to an iXTF frame (block 1330). As explained above, the iXTF frame may be used to transport the XTP frame through switch fabric 220 (FIG. 2) in a manner such that the client signal is opaque to switch fabric 220. In one implementation, ingress line module 210 may perform functions, similar to the functions described above with regard to FIG. 10, to asynchronously map the XTP frame to an iXTF frame.

The iXTF frame may be routed through switch fabric 220 (block 1340). For example, line module 210 may segment the iXTF frame into switch timeslots and distribute the iXTF frame segments on ingress links associated with one or more of switch planes 222. Switches 410 (FIG. 4) may receive the iXTF frame segments and identify egress links and timeslots on which to output the iXTF frame segments based on the ingress links on which the iXTF frame segments are received and the timeslots during which the iXTF frame segments are received. Switches 410 may store mapping information that maps a combination of an input timeslot and an ingress link to an output timeslot and an egress link. Switches 410 may route the iXTF frame segments accordingly.

The XTP frame may be recovered from the iXTF frame (block 1350). For example, an egress line module 210 may receive the iXTF frame from switch fabric 220. Egress line module 210 may recover the XTP frame from the iXTF frame. In one implementation, egress line module 210 may perform functions, similar to the functions described above with regard to FIG. 11, to recover the XTP frame from the iXTF frame.

The XTP frame may be asynchronously mapped to an XTF frame (block 1360). As explained above, the XTF frame may be used to transport the XTP frame through the optical network in a manner such that the client signal is opaque to intermediate nodes in the network. In one implementation, egress line module 210 may perform functions, similar to the functions described above with regard to FIG. 12, to asynchronously map the XTP frame to the XTF frame.

The XTF frame may be output (block 1370). For example, egress line module 210 may transmit the XTF frame on an optical link toward its destination. In one implementation, egress line module 210 may convert the XTF frame to an optical signal, of a particular wavelength, and combine the optical signal with one or more other optical signals, of one or more other wavelengths, to create a multi-wavelength optical signal that may be transmitted on the optical link. The XTF frame may transit one or more additional intermediate nodes 120 in the optical network before reaching egress node 120.

Figure 15:
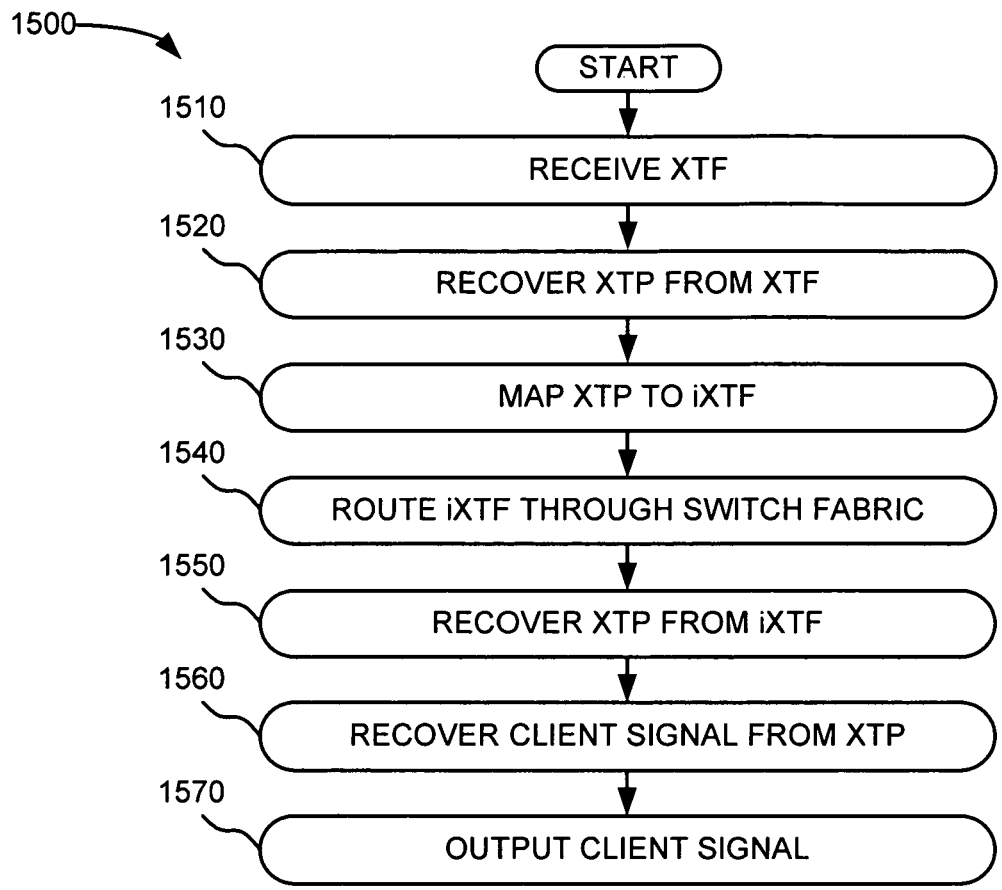
FIG. 15 is a flowchart of an exemplary process for recovering a client signal at an egress node.

FIG. 15 is a flowchart of an exemplary process 1500 for recovering a client signal at an egress node. Process 1500 may be performed by one or more components within the egress node.

Process 1500 may begin with receipt of an XTF frame (block 1510). For example, an ingress line module 210, of the egress node, may receive a multi-wavelength optical signal, separate the multi-wavelength signal into signals of individual wavelengths, and convert the signals to a stream of digital data, which may represent an XTF frame. A FM 330, within ingress line module 210, may receive the stream of data representing the XTF frame.

An XTP frame may be recovered from the XTF frame (block 1520). For example, ingress line module 210 may recover one or more XTP frames from a received XTF frame. In one implementation, as described above, a single XTF frame may include multiple XTP frames. In another implementation, a single XTF frame may include all or a portion of a single XTP frame. In one implementation, ingress line module 210 may perform functions, similar to the functions described above with regard to FIG. 14, to recover the XTP frame from the XTF frame.

The XTP frame may be asynchronously mapped to an iXTF frame (block 1530). As explained above, the iXTF frame may be used to transport the XTP frame through switch fabric 220 (FIG. 2) in a manner such that the client signal is opaque to switch fabric 220. In one implementation, ingress line module 210 may perform functions, similar to the functions described above with regard to FIG. 10, to asynchronously map the XTP frame to an iXTF frame.

The iXTF frame may be routed through switch fabric 220 (block 1540). For example, line module 210 may segment the iXTF frame into switch timeslots and distribute the iXTF frame segments on ingress links associated with one or more of switch planes 222. Switches 410 (FIG. 4) may receive the iXTF frame segments and identify egress links and timeslots on which to output the iXTF frame segments based on the ingress links on which the iXTF frame segments are received and the timeslots during which the iXTF frame segments are received. Switches 410 may store mapping information that maps a combination of an input timeslot and an ingress link to an output timeslot and an egress link. Switches 410 may route the iXTF frame segments accordingly.

The XTP frame may be recovered from the iXTF frame (block 1550). For example, tributary module 230 may receive the iXTF frame from switch fabric 220. Tributary module 230 may recover the XTP frame from the iXTF frame. In one implementation, tributary module 230 may perform functions, similar to the functions described above with regard to FIG. 11, to recover the XTP frame from the iXTF frame.

The client signal may be recovered from the XTP frame (block 1560). As explained above, the XTP frame may be used to transport all, or a portion, of the client signal. When multiple XTP frames carry the client signal, as the XTP frames traverse the optical network, the XTP frames may experience relative skew. Thus, it may be beneficial to deskew the XTP frames and reassemble them prior to extracting the client signal.

Figure 16:
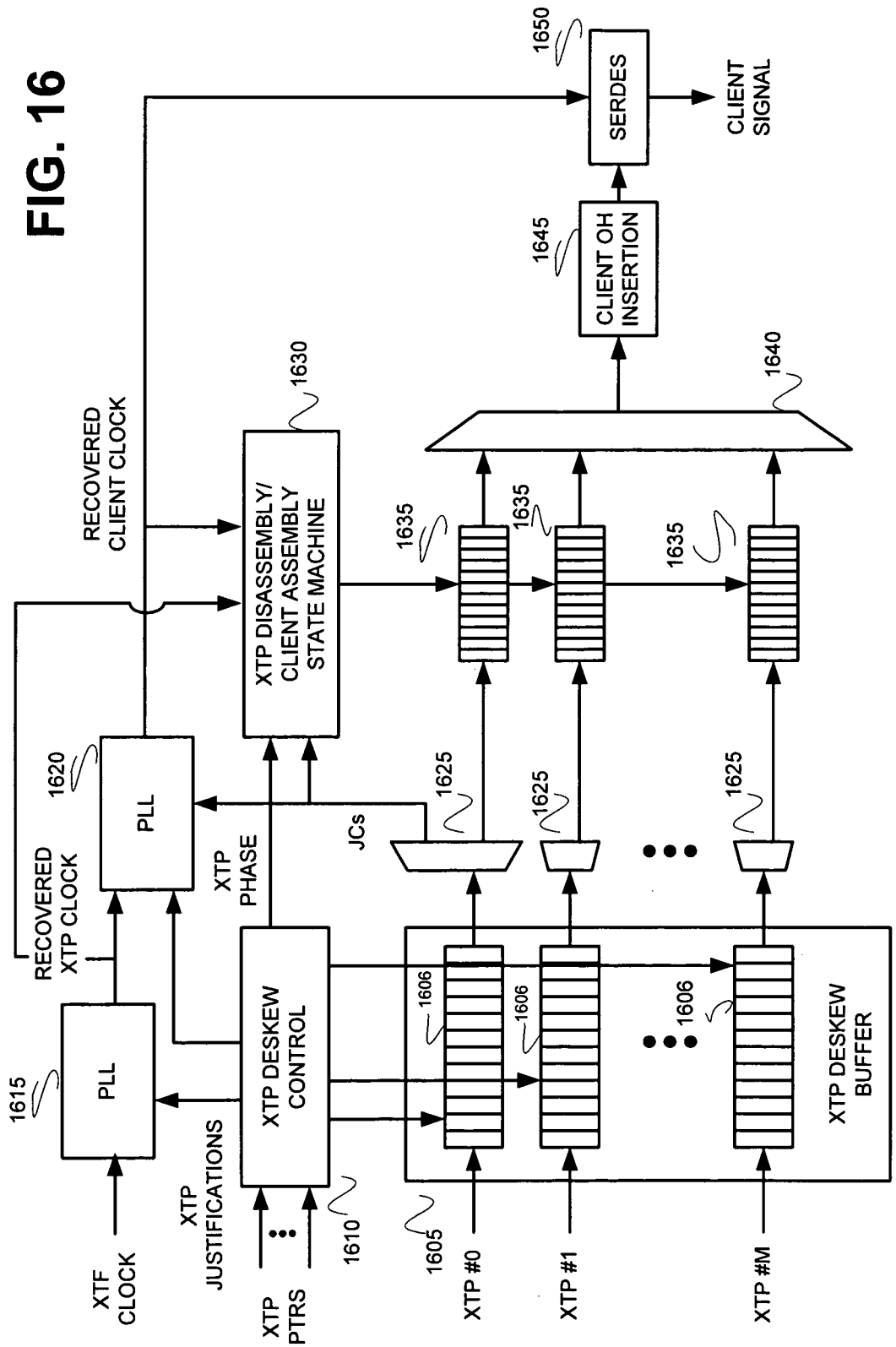
FIG. 16 is a diagram of exemplary functional components for recovering a client signal from an XTP frame.

FIG. 16 is a diagram of exemplary functional components for recovering a client signal from multiple XTP frames. In one implementation, tributary module 230 may include hardware, or a combination of hardware and software, to implement the functions of the components shown in FIG. 16. In another implementation, a device separate from, or in combination with, tributary module 230 may perform one or more of the functions described below.

Tributary module 230 may include an XTP deskew buffer 1605, XTP deskew control 1610, phase locked loop (PLL) 1615, PLL 1620, demultiplexers 1625, XTP disassembly/client assembly state machine 1630, buffers 1635, demultiplexer 1640, client overhead (OH) insertion 1645, and SerDes 1650. In another implementation, tributary module 230 may include additional, fewer, or different functional components to recover a client signal from an XTP frame.

XTP deskew buffer 1605 may receive multiple XTP frames (e.g., the XTP frames containing the client signal). XTP deskew buffer 1605 may include a number of buffers 1606. Buffer 1606 may include an elastic buffer, such as a FIFO memory, that stores an XTP frame.

XTP deskew control 1610 may receive XTP pointers corresponding to the XTP frames. XTP deskew control 1610 may control the storing and outputting of data associated with each of the XTP frames to deskew the XTP frames before the XTP frames are realigned. The implementations, described herein, may support routing of XTP frames over different fiber paths or even different physical paths (i.e., diverse routes) if sufficient deskew buffering is provided at egress node 120.

XTP deskew control 1610 may detect skew using the XTP pointers. The XTP pointer indicates the first byte/word in the XTP structure. Based on detection of the relative XTP phase, XTP deskew control 1610 can realign all of the XTP frames at the egress of XTP deskew buffer 1605.

After realignment, XTP overhead, including justification control indicators (JCs), may be extracted via demultiplexers 1625. The portion of the XTP frame containing actual client data may be recovered by extracting fixed stuff locations, and by processing the JCs. Fixed stuff locations may be predefined based on the client signal type/rate and, therefore, may be known once the XTP frame is delineated. JCs may indicate which of the positive/negative justification opportunities (PJOs/NJOs) in the XTP frame contain data and which are stuffed. Recall that in the client ingress mapping process, justifications of the client into the XTP frame may be done symmetrically on all XTP frames. By extension, all justifications may be processed symmetrically at the client ingress from the XTP frame. Therefore, only the JCs from one XTP need to be processed, and only one state machine (e.g., XTP disassembly/client assembly state machine 1630) may be needed for XTP decapsulation.

XTP disassembly/client assembly state machine 1630 may reconstruct the client signal by interleaving the client portions, per-XTP, in sequence. XTP disassembly/client assembly state machine 1630 may control the operation of buffers 1635 and multiplexer 1640. Buffer 1635 may include an elastic buffer, such as a FIFO memory, that receives portions of the client signal that have been extracted from the XTP frames. Buffers 1635 may output the client signal portions to multiplexer 1640. XTP disassembly/client assembly state machine 1630 may control multiplexer 1640 to output the client signal portions so as to interleave the client signal portions and recover the client signal.

XTP disassembly/client assembly state machine 1630 may operate based on a recovered XTP clock and/or a recovered client clock. Two PLLs 1615 and 1620 may be used to recover the client clock. PLL 1615 may receive, as input, the XTF clock signal and XTP justifications, and output the recovered XTP clock. PLL 1620 may receive the XTP clock signal and information regarding XTP justifications to recover the client clock signal. The client clock signal may be used by XTP disassembly/client assembly state machine 1630 to recover the client signal. In another implementation, the client clock may be generated in another manner, such as from a free-running clock.

Once the client signal is recovered, the client overhead may be inserted by client overhead insertion component 1645. The client overhead may have been extracted or identified by ingress node 120 and passed along within the XTP frames (or within the overhead of the XTF frames). The client overhead may also be modified, if necessary, by client overhead insertion component 1645. The client signal may then be serialized for transmission by SerDes 1650.

Returning to FIG. 15, the client signal may be output (block 1570). For example, tributary module 230 may convert the client signal data to an optical signal of a particular wavelength and output the client signal data to a client device 110. Alternatively, tributary module 230 may combine the wavelength containing the client signal with wavelengths containing other client signals to generate a multi-wavelength optical signal, and send the multi-wavelength optical signal to client device 110.

EXAMPLE

Figure 17:
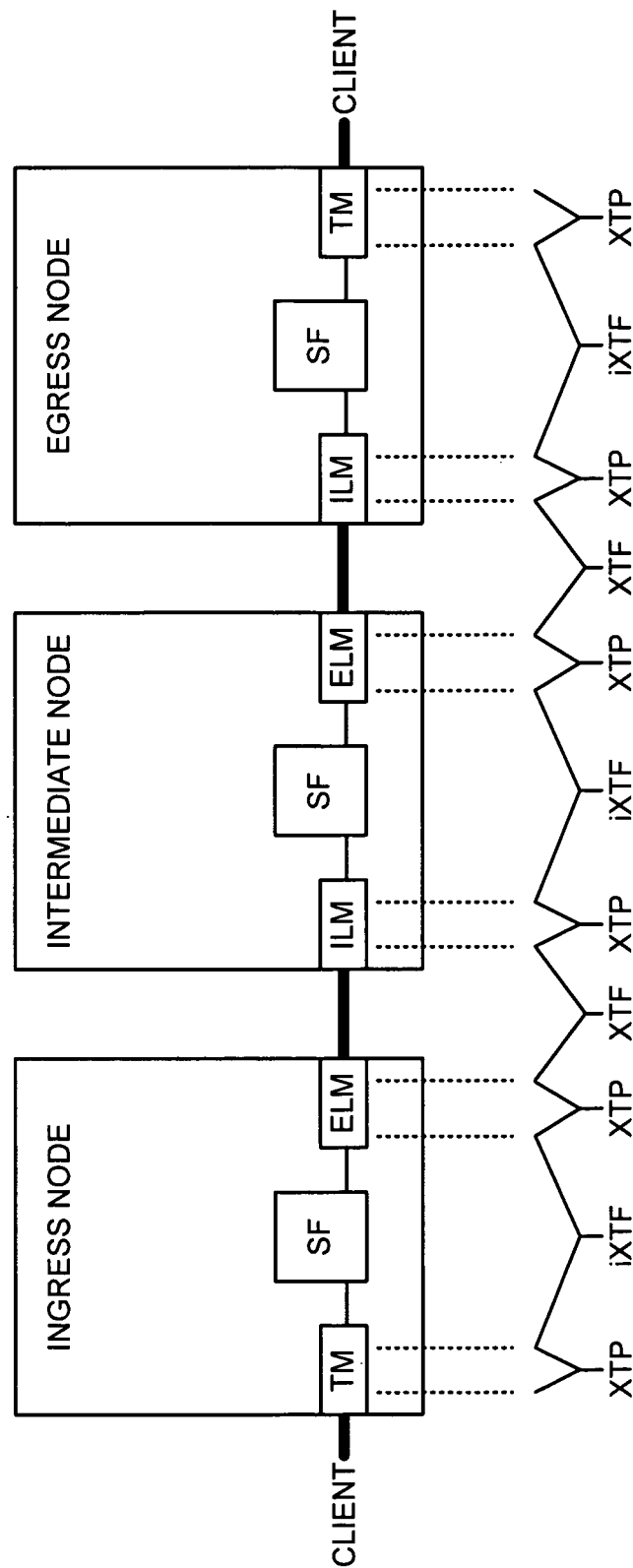
FIG. 17 is a diagram of an example of transporting a client signal through an optical network.

FIG. 17 is a diagram of an example of transporting a client signal through an optical network. FIG. 17 shows a simplified view of an optical network that includes three nodes: an ingress node, an intermediate node, and an egress node. FIG. 17 also shows a simplified view of the nodes, in which the ingress node includes a tributary module (TM), a switch fabric (SF), and an egress line module (ELM); the intermediate node includes an ingress line module (ILM), a switch fabric (SF), and an egress line module (ELM); and the egress node may include an ingress line module (ILM), a switch fabric (SF), and a tributary module (TM). Assume that the client signal is transmitted from the ingress node to the egress node.

The tributary module, of the ingress node, may receive the client signal, where the client signal has an arbitrary rate. In one implementation, the tributary module may asynchronously map the client signal into a collection of first frames, called XTP frames (e.g., see FIG. 5). The XTP frames have a particular, constant length, and a fixed rate (which is independent of the rate of the client signal). Each XTP frame may use a combination of variable and fixed stuff locations to compensate for the different rate of the client signal.

The tributary module may then asynchronously map the XTP frame into a second frame, called an iXTF frame (e.g., see FIG. 6). The iXTF frame may be used to route the XTP frame through the switch fabric to the egress line module of the ingress node. Using the iXTF frame makes the XTP frame opaque to the switch fabric. The egress line module may receive the iXTF frame and extract the XTP frame. The egress line module may then asynchronously map the XTP frame into a third frame, called an XTF frame (e.g., see FIG. 7), for transmission on the network. The XTF frame has a particular, constant length, and a fixed nominal rate (which is independent of the rate of the client signal and the rate of the XTP frame) that may differ slightly from XTF frame-to-XTF frame. Each XTF frame may use a variable stuff location to compensate for the different rate of the XTP frame. Each XTF frame may also use a pointer that identifies the start of the XTP frame within the payload of the XTF frame. The egress line module may transmit the XTF frame on an optical link to a next hop node (i.e., the intermediate node).

The ingress line module, of the intermediate node, may receive the XTF frame and extract the XTP frame. The ingress line module may then asynchronously map the XTP frame into an iXTF frame in a manner similar to that described above. The intermediate node uses the iXTF frame to route the XTP frame through the switch fabric from the ingress line module to the egress line module of the intermediate node. The egress line module may receive the iXTF frame from the switch fabric and extract the XTP frame from the iXTF frame. The egress line module may then asynchronously map the XTP frame into an XTF frame for transmission on the optical network. The intermediate node may not recover the client signal and, thus, need not be aware of the client signal being transported in the XTP frame. The intermediate node operates only upon the XTP frame—performing one level of mapping of the XTP frame into and out of an iXTF frame and an XTF frame. The intermediate node may transmit the XTF frame on an optical link to a next hop node (i.e., the egress node).

The ingress line module, of the egress node, may receive the XTF frame and extract the XTP frame. The ingress line module may asynchronously map the XTP frame into an iXTF frame in a manner similar to that described above. The egress node uses the iXTF to route the XTP through the switch fabric from the ingress line module to the tributary module, of the egress node, for transmission to a client device. The tributary module may receive the iXTF frame from the switch fabric and extract the XTP frame from the iXTF frame. The tributary module can use the pointers (that refer to the start of the XTP frame within an XTF frame) to concatenate and realign the XTP frames associated with a same client signal (which, as described above, has been mapped into multiple XTP frames). The tributary module may then extract the client signal from the XTP frames. The tributary module may transmit the client signal to a client device.

Because the intermediate node does not recover the client signal but rather operates on the fixed rate XTP frames, the hardware and software logic at the intermediate nodes can be greatly simplified. The dual level asynchronous mapping may permit the XTP frame rate to be recovered as a different step from recovering the client signal from the XTP frame. This permits justifications/pointer adjustments to be filtered differently for the XTP frame recovery versus the client signal recovery, which, in turn, permits different filtering time constants to be applied to the two processes. For example, the client signal wander characteristics can be preserved while heavily filtering the XTP justifications.

While the intermediate node has been described generally as having an ingress line module, a switch fabric, and an egress line module, this need not be the case. In one alternative implementation, the intermediate node may not include a switch fabric. In this case, it may be unnecessary to map an XTP frame into an iXTF frame. Rather, the intermediate node may recover an XTP frame from an XTF frame and map the recovered XTP frame into another XTF frame.

CONCLUSION

Implementations described herein may facilitate communication of a client signal across a network while reducing network complexity. For example, a client signal, of any arbitrary rate, may be asynchronously wrapped into a structure that is used as the vehicle for transporting the client signal. Intermediate nodes in the network operate upon the structure and not the client signal and, thus, need not recover the client signal. This simplifies the logic required in the intermediate nodes.

The structure used to carry the client signal may further be asynchronously mapped into additional structures that ease the transfer of the structures within a node and through the network. Each structure may have its own rate, which may differ from the rate of the client signal. As a result, there is no need to synchronize clocks within a node or at different nodes in the network.

The foregoing description provides illustration and description, but is not intended to be exhaustive or to limit the invention to the precise form disclosed. Modifications and variations are possible in light of the above teachings or may be acquired from practice of the invention.

For example, while series of blocks have been described with regard to FIGS. 8, 13, and 15, the order of the blocks may be modified in other implementations. Further, non-dependent blocks may be performed in parallel.

Also, certain portions of the implementations have been described as "components" that perform one or more functions. The term "component," may include hardware, such as a processor, an application specific integrated circuit (ASIC), or a field programmable gate array (FPGA), or a combination of hardware and software.

Further, while implementations have been described in the context of an optical network, this need not be the case. These implementations may apply to any form of circuit-switching network.

Also, it has been described that an XTP frame is asynchronously mapped to an iXTF frame within a node for transporting the XTP frame through the switch fabric. In other implementations, the XTP frame may be asynchronously mapped to one or more other frames within the node. For example, it may be beneficial to map the XTP frame to other frames at different locations within the node, thereby using different clock domains within the node. It may be more convenient to manage multiple clock domains rather than synchronize clocks to a single clock domain within a node.

Even though particular combinations of features are recited in the claims and/or disclosed in the specification, these combinations are not intended to limit the disclosure of the invention. In fact, many of these features may be combined in ways not specifically recited in the claims and/or disclosed in the specification. Although each dependent claim listed below may directly depend on only one other claim, the disclosure of the invention includes each dependent claim in combination with every other claim in the claim set.

No element, act, or instruction used in the present application should be construed as critical or essential to the invention unless explicitly described as such. Also, as used herein, the article "a" is intended to include one or more items. Where only one item is intended, the term "tone" or similar language is used. Further, the phrase "based on" is intended to mean "based, at least in part, on" unless explicitly stated otherwise.

What is claimed is:

1. A system, comprising:
    an ingress node configured to:
        receive a client signal comprising a client rate that is one of a plurality of client rates,
        asynchronously map the client signal into a first frame of a first rate,
        asynchronously map the first frame into a second frame of a second rate, the second frame comprising a first asynchronously mapped frame, and
        output the second frame;
    an intermediate node configured to:
        receive the second frame,
        asynchronously map the first frame into a third frame of a third rate,
        transfer the third frame through at least a portion of the intermediate node,
        recover the first frame from the third frame,
        asynchronously map the first frame into a fourth frame of a fourth rate, and
        output the fourth frame, the fourth frame comprising a second asynchronously mapped frame, the intermediate node not recovering the client signal or the portion of the client signal from the first frame; and
    an egress node configured to:
        receive the fourth frame,
        recover the first frame from the fourth frame,
        recover the client signal from the first frame, and
        output the client signal.

2. The system of claim 1, where the second rate and the fourth rate are a same rate.

3. The system of claim 1, where the second frame and the fourth frame have a same frame structure.

4. The system of claim 1, where the client rate, the first rate, and the second rate are independent of each other.

5. The system of claim 1, where, when asynchronously mapping the client signal into the first frame of the first rate, the ingress node is configured to:
    partition the client signal into portions, and
    asynchronously map each of the portions of the client signal into one of a plurality of first frames, where the plurality of first frames includes the first frame.

6. The system of claim 5, where, when recovering the client signal, the egress node is configured to:
    receive the plurality of first frames,
    concatenate the plurality of first frames, and
    recover the client signal from the concatenated plurality of first frames.

7. The system of claim 1, where the first frame includes a combination of fixed stuff and variable stuff locations that compensate for a difference between the client rate of the client signal and the first rate of the first frame, and
    where the fixed stuff location does not store data associated with the client signal and the variable stuff location selectively stores data associated with the client signal.

8. The system of claim 7, where the fixed stuff location is one of a plurality of fixed stuff locations, and
    where a number the plurality of fixed stuff locations and a distribution of the plurality of fixed stuff locations are chosen based on the client rate.

9. The system of claim 7, where one or more of a justification control indicator, a negative justification opportunity, or a positive justification opportunity are used for the variable stuff location.

10. The system of claim 1, where the second frame includes a variable stuff location that compensates for a difference between the first rate of the first frame and the second rate of the second frame, and
    where the variable stuff location selectively stores data associated with the client signal, where the second frame includes no fixed stuff location.

11. The system of claim 1, where the intermediate node includes a switch fabric, and
    where the intermediate node is further configured to:
        transfer the third frame through the switch fabric.

12. The system of claim 11, where, when transferring the third frame, the intermediate node is configured to:
    divide the third frame into a plurality of segments, and
    separately transfer each of the plurality of segments to the switch fabric.

13. The system of claim 11, where the switch fabric includes a plurality of switches, each of the plurality of switches storing mapping information that maps data received on a particular ingress link during a particular ingress timeslot to a particular egress timeslot on a particular egress link.

14. The system of claim 1, where only the ingress node maps the client signal into the first frame, and only the egress node recovers the client signal from the first frame.

15. A method performed in a network including at least a first node, a second node, and a third node, the method comprising:
    receiving, by the first node, a client signal at a client rate;
    asynchronously encapsulating, by the first node, the client signal in a first frame of a first rate;
    asynchronously encapsulating, by the first node, the first frame in a second frame of a second rate, the second frame being a first asynchronously mapped frame;
    outputting, by the first node, the second frame to the second node;
    receiving, by the second node, the second frame;
    extracting, by the second node, the first frame from the second frame;
    asynchronously encapsulating, by the second node, the first frame in a third frame of a third rate;
    transferring, by the second node, the third frame through at least a portion of the second node;
    recovering, by the second node, the first frame from the third frame;
    asynchronously encapsulating, by the second node, the first frame in a fourth frame of a fourth rate;
    outputting, by the second node, the fourth frame to the third node, the fourth frame being a second asynchronously mapped frame;
    receiving, by the third node, the fourth frame;
    extracting, by the third node, the first frame from the fourth frame;
    extracting, by the third node, the client signal from the first frame; and
    outputting, by the third node, the client signal,
    the client rate, the first rate, the second rate being independent of each other.

16. The method of claim 15, where the second rate and the fourth rate are a same rate.

17. The method of claim 15, where the second frame and the fourth frame comprise a same frame structure.

18. The method of claim 15, where asynchronously encapsulating the client signal in the first frame includes asynchronously inverse multiplexing the client signal over a plurality of first frames, and
where the first frame is one of the plurality of first frames.

19. The method of claim 18, where extracting the client signal includes:
receiving the plurality of first frames,
concatenating the plurality of first frames, and
extracting the client signal from the concatenated plurality of first frames.

20. The method of claim 15, where the first frame includes a combination of fixed stuff and variable stuff locations, and
where the fixed stuff location does not store data associated with the client signal and the variable stuff location selectively stores data associated with the client signal.

21. The method of claim 15, where the second frame includes a variable stuff location and no fixed stuff location, and
where the variable stuff location selectively stores data associated with the client signal.

22. The method of claim 15, where the second node includes a switch fabric, and
where the method further comprises:
transferring the third frame through the switch fabric.

23. The method of claim 22, where transferring the third frame includes:
dividing the third frame into a plurality of segments, and
separately transferring each of the plurality of segments to the switch fabric.

24. The method of claim 22, where the switch fabric includes a plurality of switches, each of the plurality of switches storing mapping information that maps data received on a particular ingress link during a particular ingress timeslot to a particular egress timeslot on a particular egress link.

25. An intermediate node in a network that includes an ingress node and an egress node, the intermediate node comprising:
an ingress line module;
an egress line module; and
a switch fabric connected to the ingress line module and the egress line module;
the ingress line module being configured to:
receive a first frame from the ingress node,
the first frame encapsulating a second frame,
the second frame encapsulating a client signal,
the first frame being associated with a first rate,
the second frame being associated with a second rate,
the client signal being associated with a third rate, and
the first frame comprising a first asynchronously mapped frame,
recover the second frame from the first frame,
asynchronously map the second frame to a third frame that is associated with a fourth rate, and
transfer the third frame to the switch fabric,
the switch fabric being to:
transfer the third frame to the egress line module,
the egress line module being configured to:
recover the second frame from the third frame,
asynchronously map the second frame to a fourth frame that is associated with a fifth rate, and
output the fourth frame to the egress node, the fourth frame being a second asynchronously mapped frame, the intermediate node not recovering the client signal from the second frame.

26. The intermediate node of claim 25, where the first rate and the fifth rate are a same rate.

27. The intermediate node of claim 25, where the first frame and the fourth frame comprise a same frame structure.

28. The intermediate node of claim 25, where, when transferring the third frame to the switch fabric, the ingress line module is configured to:
divide the third frame into a plurality of segments, and
separately transfer each of the plurality of segments to the switch fabric.

29. A method for transferring data across a network that includes an ingress node, an egress node, and a plurality of intermediate nodes, the method comprising:
receiving, at the ingress node, a plurality of client signals that comprise a corresponding plurality of client rates;
asynchronously mapping, at the ingress node, each of the plurality of client signals into a plurality of first frames, each of the plurality of first frames comprising a same structure and a same rate;
transporting the plurality of first frames across the network to the egress node via one or more of the plurality of intermediate nodes;
asynchronously mapping, within one of the one or more of the plurality of intermediate nodes, one of the plurality of first frames into a second frame;
transmitting, within the one of the one or more of the plurality of intermediate nodes, the second frame through at least a portion of the one of the one or more of the plurality of intermediate nodes;
recovering, within the one of the one or more of the plurality of intermediate nodes, the one of the plurality of first frames from the second frame;
asynchronously mapping, within the one of the one or more of the plurality of intermediate nodes, the one of the plurality of first frames into a third frame;
outputting the third frame to the egress node,
none of the one or more of the intermediate nodes recovering any of the plurality of client signals; and
recovering the plurality of client signals at the egress node.

30. The method of claim 29, where one of the ingress node, the intermediate node, or the egress node may function as another one of the egress node, the intermediate node, or the ingress node for another client signal.

31. The method of claim 29, where transporting the plurality of first frames across the network includes managing connections in the network based on a collection of the plurality of first frames.

32. The method of claim 29, further comprising:
providing protection for the client signals on a per-first frame level.

* * * * *